United States Patent
Yashiro et al.

(10) Patent No.: US 12,264,418 B2
(45) Date of Patent: Apr. 1, 2025

(54) METHOD FOR PRODUCING DRAWN CONJUGATED FIBER, AND DRAWN CONJUGATED FIBER

(71) Applicant: UBE EXSYMO CO., LTD., Tokyo (JP)

(72) Inventors: Hirohumi Yashiro, Tokyo (JP); Kouki Endou, Tokyo (JP); Tatsunori Tsukahara, Tokyo (JP)

(73) Assignee: UBE EXSYMO CO., LTD., Tokyo (JP)

( * ) Notice: Subject to any disclaimer, the term of this patent is extended or adjusted under 35 U.S.C. 154(b) by 309 days.

(21) Appl. No.: 17/902,461

(22) Filed: Sep. 2, 2022

(65) Prior Publication Data

US 2023/0002936 A1 Jan. 5, 2023

Related U.S. Application Data

(62) Division of application No. 14/905,499, filed as application No. PCT/JP2014/069370 on Jul. 22, 2014, now abandoned.

(30) Foreign Application Priority Data

Jul. 23, 2013 (JP) .................................. 2013-152703

(51) Int. Cl.
*C08K 5/1575* (2006.01)
*B29C 48/05* (2019.01)
(Continued)

(52) U.S. Cl.
CPC ................ *D01F 8/06* (2013.01); *B29C 48/05* (2019.02); *C08K 5/0083* (2013.01);
(Continued)

(58) Field of Classification Search
CPC .. C08K 5/0083; C08K 5/0091; C08K 5/1575; C08K 5/52; C08K 5/521; D01D 5/08;
(Continued)

(56) References Cited

U.S. PATENT DOCUMENTS 5,116,524 A 5/1992 Carduck et al.
5,804,517 A 9/1998 Ishii et al.
(Continued)

FOREIGN PATENT DOCUMENTS

CN 10219171 A 9/2011
JP 3-503777 A 8/1991
(Continued)

OTHER PUBLICATIONS

Translation of JP 10266056 A (published on Oct. 6, 1998).*
(Continued)

*Primary Examiner* — Leo B Tentoni
(74) *Attorney, Agent, or Firm* — Birch, Stewart, Kolasch & Birch, LLP

(57) ABSTRACT

Provided are a method for producing a drawn conjugated fiber, capable of producing a conjugated fiber having a high strength and a thin fineness, and a drawn conjugated fiber. A drawn conjugated fiber is produced by performing a spinning step of obtaining an undrawn fiber having a core-sheath structure in which a core material is a resin containing, as a main component, a crystalline propylene polymer and a sheath material is a resin containing, as a main component, an olefin polymer having a melting point lower than that of the core material, by means of melt-spinning (step S1); and a drawing step of drawing the undrawn fiber (step S2).

10 Claims, 3 Drawing Sheets

(51) Int. Cl.
- *C08K 5/00* (2006.01)
- *C08K 5/52* (2006.01)
- *C08K 5/521* (2006.01)
- *D01D 5/08* (2006.01)
- *D01D 5/098* (2006.01)
- *D01D 5/12* (2006.01)
- *D01D 5/34* (2006.01)
- *D01F 1/10* (2006.01)
- *D01F 8/06* (2006.01)
- *D02J 1/22* (2006.01)
- *D04H 1/4291* (2012.01)
- *D04H 1/4382* (2012.01)
- *D04H 1/541* (2012.01)
- *B29K 23/00* (2006.01)
- *D01F 6/46* (2006.01)

(52) U.S. Cl.
CPC ............ *C08K 5/0091* (2013.01); *D01D 5/12* (2013.01); *D01D 5/34* (2013.01); *D01F 1/10* (2013.01); *D02J 1/222* (2013.01); *D04H 1/4291* (2013.01); *D04H 1/43828* (2020.05); *D04H 1/5412* (2020.05); *B29K 2023/10* (2013.01); *D01F 6/46* (2013.01); *D10B 2321/021* (2013.01); *D10B 2321/022* (2013.01)

(58) Field of Classification Search
CPC ............ D01D 5/098; D01D 5/12; D01D 5/16; D01D 5/34; D01F 1/10; D01F 8/06; D02J 1/22; D02J 1/222
USPC ..... 264/172.15, 172.18, 210.4, 210.6, 210.8, 264/331.17; 524/110, 145
See application file for complete search history.

(56) References Cited

U.S. PATENT DOCUMENTS

| | | |
|---|---|---|
| 2006/0057374 A1 | 3/2006 | Sartori et al. |
| 2010/0173547 A1 | 7/2010 | Katayama et al. |
| 2011/0189915 A1 | 8/2011 | Morimoto et al. |
| 2014/0323003 A1 | 10/2014 | Richeson et al. |
| 2015/0368836 A1 | 12/2015 | Koori et al. |

FOREIGN PATENT DOCUMENTS

| | | | | |
|---|---|---|---|---|
| JP | 10266056 A | * | 10/1998 | ............... D01D 5/34 |
| JP | 11-081122 A | | 3/1999 | |
| JP | 11-131319 A | | 5/1999 | |
| JP | 2002-180330 A | | 6/2002 | |
| JP | 2004346476 A | * | 12/2004 | ............... D01F 8/06 |
| JP | 2006152482 A | * | 6/2006 | ............... D01F 8/06 |
| JP | 2006-214019 A | | 8/2006 | |
| JP | 2007-107143 A | | 4/2007 | |
| JP | 2009-133039 A | | 6/2009 | |
| WO | WO 2012/064469 A1 | | 5/2012 | |

OTHER PUBLICATIONS

Translation of JP 2004346476 A (published on Dec. 9, 2004).*
Translation of JP 2006152482 A (published on Jun. 15, 2006).*
International Search Report issued in PCT/JP2014/069370, mailed on Oct. 21, 2014.
Written Opinion issued in PCT/JP2014/069370, mailed on Oct. 21, 2014.

* cited by examiner

[Fig. 1]
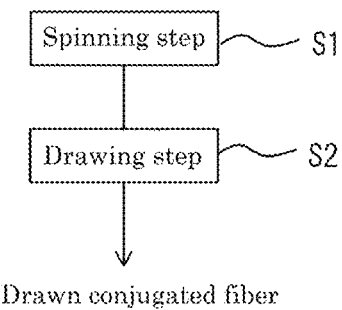
[Fig. 2]
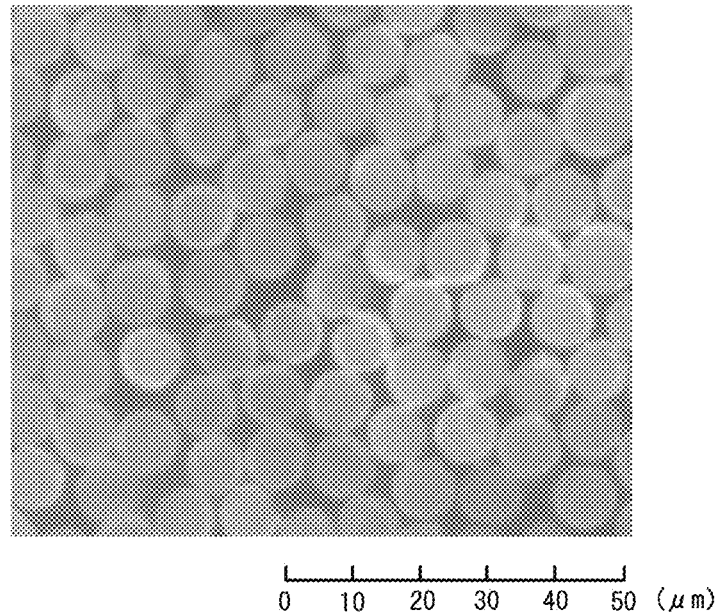

[Fig. 3]
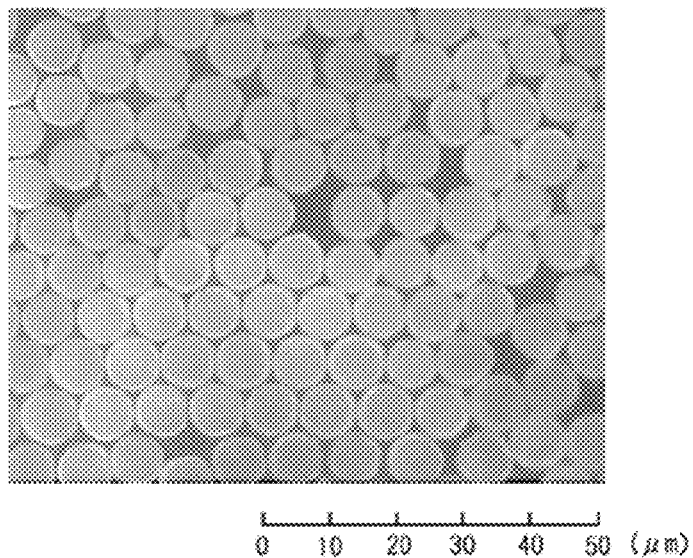
[Fig. 4]
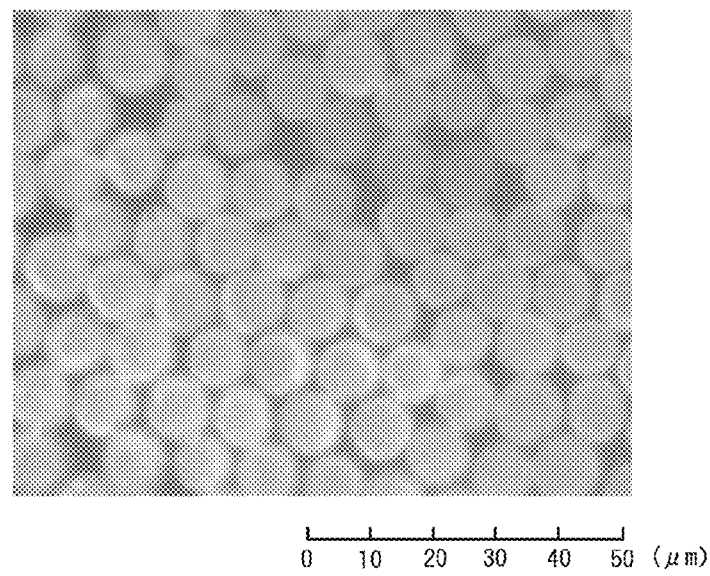

[Fig. 5]
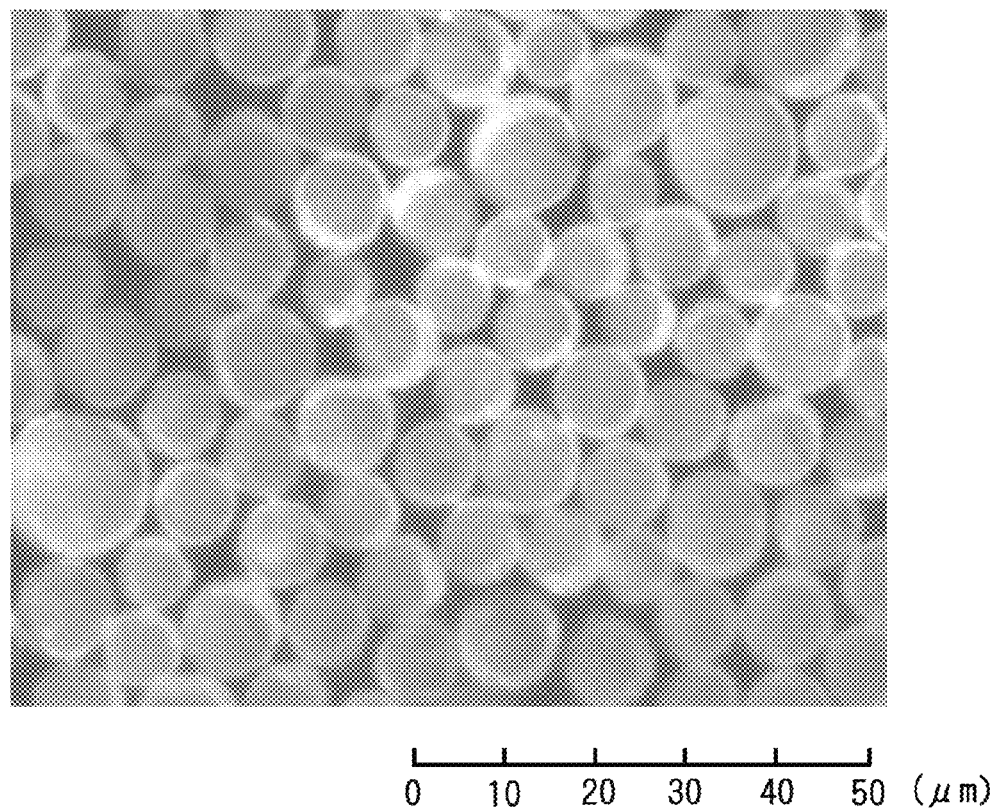

METHOD FOR PRODUCING DRAWN CONJUGATED FIBER, AND DRAWN CONJUGATED FIBER

CROSS-REFERENCE TO RELATED APPLICATIONS

This application is a Divisional application of application Ser. No. 14/905,499 (now abandoned), filed on Jan. 15, 2016, which is the National Phase under 35 U.S.C. § 371 of International Application No. PCT/JP2014/069370, filed on Jul. 22, 2014, which claims the benefit under 35 U.S.C. § 119 (a) to Patent Application No. 2013-152703, filed in Japan on Jul. 23, 2013, all of which are hereby expressly incorporated by reference into the present application.

TECHNICAL FIELD

The present invention relates to a method for producing a drawn conjugated fiber, and a drawn conjugated fiber. More particularly, the invention relates to a method in which undrawn fibers having a core-sheath structure are drawn to produce a drawn conjugated fiber, and a drawn conjugated fiber produced in this method.

BACKGROUND ART

Conjugated fibers having a core-sheath structure, formed using two kinds of resins having different properties from each other, are used in a wide range of fields. For example, a uniform non-woven fabric can be obtained from an olefin conjugated fiber by cutting the fiber into chopped fibers having a length of about 5 mm or less, and paper-making thereof. The olefin conjugated fiber is used as various filter materials or separators for batteries, because of its excellent chemical resistance. Such a conjugated fiber having a core-sheath structure is generally produced by forming undrawn fibers having a core-sheath structure by melt-spinning, and drawing the undrawn fibers.

For improving various performances of the drawn conjugated fiber having a core-sheath structure, various studies have hitherto been made (see Patent Documents 1 and 2). Patent Document 1 proposes, for example, a method for producing a drawn conjugated fiber having a high strength in a high productivity by drawing undrawn conjugated fibers having a core material of a crystalline propylene polymer and a sheath material of an olefin polymer other than the above, and drawing the undrawn conjugated fibers in pressurized saturated steam. In a conjugated fiber described in Patent Document 2, a ratio in a weight average molecular weight between a crystalline propylene polymer, which is a core material, and a olefin polymer, which is a sheath material, is adjusted to a specific range, thereby appropriately selecting a melt flow rate (MFR) of a core component and an MFR of a sheath component, which are discharged from a spinneret, and as a result, a strength reappearance to a draw ratio is improved while the drawability is secured.

Recently, in order to further improve performances, a non-woven fabric, which is thinner, stronger and finer, is required and it is also required to make a fineness of a conjugated fiber, used for production of the fabric above, thinner. With polyester fiber, for example, some methods for making a fineness thinner are adopted in which spinning and drawing are performed, in which undrawn fibers having a sea-island structure are drawn to remove a sea component, and in which segmented undrawn fibers are drawn to perform a dividing process. On the other hand, with an olefin conjugated fiber, it is difficult to obtain undrawn fibers having a thin fineness by the method of performing the spinning and the drawing, because of its high melt tension, and thus the dividing process is mainly used to make the fineness thinner. It is also proposed to make the fineness of a conjugated fiber thinner by a melt-blowing method or an electrospinning method (see Patent Document 3).

CITATION LIST

Patent Literatures

[Patent Document 1] JP-A No. 2002-180330
[Patent Document 2] JP-A No. 2007-107143
[Patent Document 3] JP-A No. 2009-133039

SUMMARY OF INVENTION

Technical Problem

When the fineness of the olefin conjugated fiber is made thinner by the dividing process, however, the dispersibility is problematically reduced in formation of a non-woven fabric by a paper-making method because the division tends to progress in a step using a slurry. A conjugated fiber, whose fineness is made thinner by the melt-blowing method or the electrospinning method, has problems of poor fiber physical properties and a weak strength of an obtained non-woven fabric. For those reasons, in the olefin conjugated fiber, it is required to produce a conjugated fiber having a thin fineness by the method of spinning and drawing.

The present invention aims mainly at providing a method for producing a drawn conjugated fiber, capable of producing a conjugated fiber having a high strength and a thin fineness, and a drawn conjugated fiber.

Solution to Problem

In order to solve the problems described above, the present inventors have diligently made experiments and studies to make a fineness of an undrawn fiber thinner. As a result, they have found that when an MFR of a core material discharged from a spinneret, and a ratio (=a core material MFR/a sheath material MFR) of the MFR of the core material discharged from the spinneret to an MFR of a sheath material discharged from the spinneret are adjusted to specific ranges, a melt tension can be controlled, whereby it is possible to stably perform spinning of an undrawn fiber having a fineness of 1.5 dTex or less, and it is further possible to obtain a drawn conjugated fiber having a thin fineness by drawing the undrawn fibers in a high ratio; and have reached the present invention.

A method for producing a drawn conjugated fiber according to the present invention includes a spinning step of obtaining an undrawn fiber having a core-sheath structure in which a core material is a resin containing, as a main component, a crystalline propylene polymer and a sheath material is a resin containing, as a main component, an olefin polymer having a melting point lower than that of the core material, by means of melt-spinning; and a drawing step of drawing the undrawn fiber, wherein the undrawn fiber has a fineness of 1.5 dTex or less, and in the spinning step, the core material discharged from a spinneret has a melt flow rate of 70 to 170 g/10 minutes at 230° C. and a load of 21.18 N, and a ratio of the melt flow rate of the core material discharged from the spinneret at 230° C. and a load of 21.18 N to a melt flow rate of the sheath material discharged from the spinneret at 230° C. and a load of 21.18 N is from 1 to 2.2.

In the method for producing a drawn conjugated fiber, at least one of a hydroxyamine ester, an isotactic polypropylene having a melt flow rate of 700 to 1550 g/10 minutes at 230° C. and a load of 21.18 N, and a metallocene polypropylene is added to the resin containing, as the main component, the crystalline propylene polymer, whereby the melt flow rate of the core material discharged from the spinneret at 230° C. can be adjusted.

In the spinning step, the sheath material discharged from the spinneret has a melt flow rate, for example, within a range of 60 to 90 g/10 minutes at 230° C. and a load of 21.18 N.

Here, for example, an isotactic polypropylene may be used as the crystalline propylene polymer which is the main component of the core material.

On the other hand, according to the method for producing a drawn conjugated fiber of the present invention, a nucleating agent may be added to the resin containing, as the main component, the crystalline propylene polymer.

In such case, an organic nucleus-creating agent may be used as the nucleating agent, for example.

Specific examples of the organic nucleus-creating agent may include a metal salt of phosphate ester and a dibenzylidene sorbitol.

Also, for example, a high density polyethylene may be used as the olefin polymer which is the main component of the sheath material.

In the method for producing a drawn conjugated fiber of the present invention, the drawing step may be continuously performed after the spinning step.

The drawing step may be performed in pressurized saturated steam.

The drawn conjugated fiber according to the present invention is obtained by drawing an undrawn fiber having a core-sheath structure in which a core material is a resin containing, as a main component, a crystalline propylene polymer and a sheath material is a resin containing, as a main component, an olefin polymer having a melting point lower than that of the core material, wherein the undrawn fiber has a fineness of 1.5 dTex or less, and the core material has a degree of crystallinity of 35% or more, measured according to a heat of fusion method at a temperature elevation rate of 30° C./minute using a differential scanning calorimeter.

In the drawn conjugated fiber, a nucleating agent may be added to the resin containing, as the main component, the crystalline propylene polymer, and in such case, a degree of crystallinity of the core material can be adjusted to 40% or more, measured according to a heat of fusion method at a temperature elevation rate of 30° C./minute using a differential scanning calorimeter.

In the drawn conjugated fiber of the present invention, when the undrawn fiber is spun, the core material discharged from the spinneret has a melt flow rate within a range of 70 to 170 g/10 minutes at 230° C. and a load of 21.18 N, and a ratio of the melt flow rate of the core material discharged from the spinneret at 230° C. and a load of 21.18 N to a melt flow rate of the sheath material discharged from the spinneret at 230° C. and a load of 21.18 N is, for example, from 1 to 2.2.

Advantageous Effects of Invention

According to the present invention, a conjugated fiber having a high strength and a thin fineness can be produced, because the melt flow rate of the core material discharged from the spinneret is adjusted to a specific range, and at the same time, a ratio of the melt flow rate of the core material to a melt flow rate of the sheath material discharged from the spinneret is adjusted to a specific range.

BRIEF DESCRIPTION OF DRAWINGS

FIG. 1 is a flow chart showing a method for producing a drawn conjugated fiber according to an embodiment of the present invention.

FIG. 2 is a photomicrograph showing cross-sections of undrawn fibers of Example 2.

FIG. 3 is a photomicrograph showing cross-sections of undrawn fibers of Example 4.

FIG. 4 is a photomicrograph showing cross-sections of undrawn fibers of Example 5.

FIG. 5 is a photomicrograph showing cross-sections of undrawn fibers of Comparative Example 5.

DESCRIPTION OF EMBODIMENTS

Embodiments for carrying out the present invention will be explained in detail below, referring to drawings attached. The present invention is not limited to embodiments described below.

[Overall Structure]

FIG. 1 is a flow chart showing a method for producing a drawn conjugated fiber according to an embodiment of the present invention. As shown in FIG. 1, in the method for producing a drawn conjugated fiber according to the embodiment of the present invention, a spinning step of obtaining undrawn fibers having a core-sheath structure by means of melt-spinning (Step S1), and a drawing step of drawing the undrawn fibers (Step S2) are performed. In the following explanation, a value of the melt flow rate (MFR) is a value obtained by measurement under conditions of a temperature: 230° C. and a load: 21.18 N in accordance with JIS K 7210 A-Method, unless otherwise noted.

[Step S1: Spinning Step]

In the spinning step, undrawn fibers are obtained by means of melt-spinning which fibers have a core-sheath structure in which a core material is a resin containing, as a main component, a crystalline propylene polymer and a sheath material is a resin containing, as a main component, an olefin polymer having a melting point lower than that of the core material, and which fibers have a fineness of 1.5 dTex or less. At that time, an MFR of the core material discharged from the spinneret is adjusted to a range of 70 to 170 g/10 minutes, and a ratio (=the core material MFR/a sheath material MFR) of the MFR of the core material discharged from the spinneret to an MFR of the sheath material discharged from the spinneret is adjusted to 1 to 2.2.

(Core Material: Crystalline Propylene)

The crystalline propylene polymer, which is the main component of the core material, may include, for example, crystalline isotactic propylene homopolymer; ethylene-propylene random-copolymers having a low content of ethylene units; propylene block-copolymers formed of a homo part containing a propylene homopolymer and a copolymerization part containing an ethylene-propylene random-copolymer with a relatively high content of ethylene units; crystalline propylene-ethylene-α-olefin copolymers wherein each homo part or each copolymerization part in the propylene block-copolymer described above is obtained by copolymerization of the above components with an α-olefin such as butene-1, and the like. Of these, the isotactic polypropylene is preferable in terms of the drawability, the physical properties of the fiber, and the inhibition of heat shrinkage.

It is preferable to add a nucleating agent to the core material (the resin containing, as the main component, the crystalline propylene polymer). The addition of the nucleating agent to the core material raises a re-crystallization temperature, because the nucleating agent itself acts as a crystal nucleus or as a nucleus-creating agent inducing crystal formation to the crystalline propylene polymer, when the melted core material is discharged from the spinneret and cooled. This can stabilize the cooling in the spinning step, and can reduce a fineness unevenness among spun fibers (undrawn fibers), a sheath to core ratio unevenness in a fiber, and an uneven coating with the sheath material in which the core material is partially exposed without coating of the sheath material.

As a result, an unevenness among a number of spun fibers (undrawn fibers), discharged from the spinneret and spun, and an evenness insides thereof are decreased, and thus a draw ratio can be further increased and the drawability can be improved in the drawing step. In addition, fine crystals are readily formed because of increase of the number of crystal nuclei, and thus undrawn fibers capable of being drawn at a high ratio and a high speed can be obtained; in other ward, it is possible to previously form an inside structure which is easily drawn in the spinning step, a pre-step of the drawing step.

Here, it is possible to use an inorganic nucleating agent or an organic nucleating agent as the nucleating agent which is added to the core material. Specific examples of the inorganic nucleating agent may include talk, kaolin, silica, carbon black, titanium oxide, zinc oxide, magnesium oxide, aluminum oxide, neodymium oxide, calcium sulfate, barium sulfate, and the like. Specific examples of the organic nucleating agents may include benzoic acid metal salt-based nucleating agents such as sodium benzoate and calcium benzoate; oxalic acid metal salt-based nucleating agents such as calcium oxalate; stearic acid metal salt-based nucleating agents such as magnesium stearate and calcium stearate; benzoate metal salt-based nucleating agent such as aluminum benzoate, potassium benzoate, and lithium benzoate; phosphate metal salt-based nucleating agents; and dibenzylidene sorbitol-based nucleating agents.

The nucleating agent may be any of nucleating agents which are melted together with the core material and nucleating agents which are not completely melted and dispersed in the resin, when the resin containing, as the main component, the crystalline propylene polymer, which is the core material, is in a melted state, and may also be nucleating agents which are not melted and act as the nucleus. In the method for producing a drawn conjugated fiber of the present embodiment, it is preferable to use the nucleating agent which is melted together with the resin and has an affinity for the resin, and the nucleating agent which is not completely melted but is partially compatible with the resin in terms of the resin containing, as the main component, the crystalline propylene polymer.

When such nucleating agent is used, the drawability in the next step can be further improved by the inside structure formed of fine crystals, while the effects of reducing the fineness (thickness) unevenness among the fibers and the core-sheath component ratio unevenness inside the fiber upon cooling of the fiber just after the spinning. The inorganic nucleating agent is not melted, and thus it is necessary to finely adjust an addition amount of the nucleating agent depending on the spinning condition and drawing condition, but the organic nucleating agent can be adapted to a wider spinning and drawing condition in a relatively small addition amount. It is preferable, accordingly, to use the organic nucleating agent for the nucleating agent, and it is more preferable to use the organic nucleus-creating agent because it is melted together with the resin and has the affinity for the resin, particularly in terms of the resin containing, as the main component, the crystalline propylene polymer.

The organic nucleus-creating agent which is melted together with the resin and has the affinity for the resin may include, for example, dibenzylidene sorbitol-based nucleating agents. Specifically, it is preferable to use dibenzylidene sorbitol (DBS), monomethyl dibenzylidene sorbitol (such as 1,3:2,4-bis(p-methylbenzylidene)sorbitol (p-MDBS), dimethyl dibenzylidene sorbitol (such as 1,3:2,4-bis(3,4-dimethylbenzylidene)sorbitol (3,4-DMDBS), or the like.

On the other hand, as the organic nucleating agent a part of which is compatible with the resin, nucleating agents having a relatively large organic backbone having a molecular weight of more than about 400 are preferable. Specific examples thereof may include metal salt of phosphate ester-based nucleating agents. Of various metal salt of phosphate ester-based nucleating agents, phosphoric acid-2,2'-methylenebis(4,6-di-tert-butylphenyl)aluminum salts, and phosphoric acid-2,2'-methylenebis(4,6-di-tert-butylphenyl) alkali metal salts are particularly preferable. In addition, as the alkali metal in the metal salt of phosphate ester-based nucleating agent, sodium, lithium and potassium are preferable.

The various nucleating agents described above may be used alone, or may be used as a mixture in which the agents are mixed in an appropriate ratio considering the effects, the productivity, and the like. When the addition amount of the nucleating agent to the core material is too small, effects of fixing the fiber shape such as unevenness reductions among the fibers and in the fiber can be insufficiently obtained upon spinning cooling, and the formation of fine crystals is insufficient. On the other hand, when the addition amount of the nucleating agent to the core material is too large, the effects described above are saturated and stains on the spinneret are increased, therefore the stability in the spinning step is reduced. From those reasons, in general, the addition amount of the nucleating agent is adjusted to preferably 0.05 to 1% by mass based on the total mass of the core material, more preferably 0.1 to 0.5% by mass.

(Sheath Material: Olefin Polymer)

The olefin polymer, which is the main component of the sheath material, may include, for example, olefin polymers such as high density, medium density or low density polyethylene, and linear low density polyethylene; copolymers of propylene and another α-olefin, specifically including a propylene-butene-1 random copolymer and propylene-ethylene-butene-1 random copolymer; noncrystalline propylene polymers such as soft polypropylene, poly-4-methylpentene-1, and the like. The olefin polymers may be used alone or as a mixture of two or more kinds. Of these, the high density polyethylene is particularly preferable in terms of the fiber physical properties.

(MFR)

When the core material discharged from the spinneret has an MFR of less than 70 g/10 minutes, the melt tension of the melted resin is increased and it is difficult to obtain undrawn fibers having a fineness of 1.5 dTex or less. When the core material discharged from the spinneret has an MFR of more than 170 g/10 minutes, the melt tension of the melted resin is too low, and the fineness unevenness among the undrawn fibers is increased and the spinning property is apt to be remarkably lowered. The MFR of the core material discharged from the spinneret is, accordingly, adjusted to a range of 70 to 170 g/10 minutes.

When the ratio (=the core material MFR/the sheath material MFR) of the MFR of the core material discharged from the spinneret to the MFR of the sheath material discharged from the spinneret is less than 1, the melt tension of the melted resin is more likely to be increased, and it is difficult to obtain undrawn fibers having a fineness of 1.5 dTex or less. When the ratio of the core material MFR to the sheath material MFR is more than 2.2, the melt tension of the melted resin is too low, and thus the fineness unevenness among the undrawn fibers is increased, the sheath-core unevenness is caused in the fiber level, and the uneven coating with the sheath material on the core material (exposure of the core material) is caused, thereby remarkably reducing the spinning property. The ratio of the MFR of the core material discharged from the spinneret to the MRF of the sheath material discharged from the spinneret is, therefore, adjusted to a range of 1 to 2.2.

On the other hand, though the MFR of the sheath material discharged from the spinneret is not particularly limited, it is preferable to adjust the MFR to, for example, a range of 60 to 90 g/10 minutes, in terms of the production cost and the versatility.

Here, as for the olefin polymer, which is the sheath material, it is possible to adjust the viscosity of the discharged resin during the spinning by changing the spinning temperature. On the other hand, as for the crystalline propylene, which is the core material, it is also possible to adjust the viscosity of the discharged resin during the spinning by adding at least one of an isotactic polypropylene having a high MFR (about 700 to 1550 g/10 minutes), a metallocene polypropylene, and a hydroxyamine ester, which is a radical generator or also a thermal decomposition agent, in addition to the change of the spinning temperature. It is also possible to adjust the viscosity of the discharged resin of the core material during the spinning by adding a polypropylene wax having a small molecular weight, or the like.

It is also possible to adjust the MFR of the core material discharged from the spinneret in a method using a main raw material of the core material having an artificially widened molecular weight distribution, obtained by mixing two or more crystalline polypropylenes having a different MFR, or in a method using crystalline propylene having a low MFR (about 10 g/10 minutes or less). When the MFR of the core material is adjusted in the methods described above, however, undrawn fibers having a thin fineness can be obtained, but the draw ratio tends to be lowered in the subsequent drawing step. For that reason, for the core material, it is preferable to use the crystalline propylene having a high MFR (about 20 to 70 g/10 minutes) and a narrow molecular weight distribution.

It is more preferable to use the resin having a high MFR and a narrow molecular weight distribution and containing, as the main component, the crystalline propylene polymer for the core material, and to add thereto the isotactic polypropylene having a high MFR and/or the metallocene polypropylene, and the hydroxyamine ester-based radical generator having the effect of reducing a molecular weight of the polypropylene resin. This allows the isotactic polypropylene having a high MFR and/or the metallocene polypropylene to be decomposed by the hydroxyamine ester-based radical generator to serve as a plasticizer, thus resulting in the improved drawability in the drawing step.

[Step S2: Drawing Step]

In the drawing step, the undrawn fibers, produced in the spinning step described above, were drawn to obtain a drawn conjugated fiber having a pre-determined fineness. The drawing step may be performed separately from the spinning step, or may be performed continuously after the spinning step. In a process in which the undrawn fibers, produced in the spinning step, are collected and multiply wound to be then drawn, a standby time is created until the number of the spun fibers (the undrawn fibers) necessary in the drawing step is obtained because the spinning step and the drawing step are separately performed. When these steps are continuously performed, however, the state of the undrawn fiber to be drawn is uniform because such standby time is unnecessary. As a result, the fineness and the fiber properties of the drawn conjugated fibers are homogenized and the stability is improved in the drawing step because the maximum ratios capable of drawing are equal among the fibers compared to the case where the two steps are performed separately.

It is desirable to perform the drawing step at a high temperature, whereby the drawing can be performed in a high ratio, and the drawn conjugated fiber having a thin fineness can be obtained. A contact heating drawing with a high temperature heating plate, a radiative heating drawing using far infrared rays, a heating drawing using warm water, or a heating drawing using steam can be applied to the heating drawing method in the drawing step. Of these methods, the drawing in pressurized saturated steam is preferable, because the fiber to be heated can be heated in an immediately short time. As for tow drawing, used in production of staple fiber or chopped strands, it is necessary that assemblies of undrawn fibers having a large total fineness are drawn, and thus highly pressurized saturated steam heating drawing is particularly preferable, because the inside of the tow can be heated uniformly in a short time.

When the drawing is performed in pressurized saturated steam, the conditions are not particularly limited, and it is usually performed at 110° C. or higher. When the temperature of the pressurized saturated steam is lower than 110° C., it may sometimes be difficult to perform the drawing at a high ratio and a high speed. The higher temperature of the pressurized saturated steam is basically better so long as the olefin polymer of the sheath material is not melted. Considering the draw ratio, the drawing speed, and the economy, the preferable temperature range of the pressurized saturated steam is from 115 to 130° C., and more preferably from 120 to 125° C.

On the other hand, the draw ratio can be appropriately selected depending on the fineness of the undrawn fibers, and it is usually from 3.0 to 10.0 times in the total draw ratio, and preferably from 4.0 to 8.0 times. The drawing speed can be adjusted to, for example, about 40 to 150 m/minute. In particular, when the spinning step and the drawing step are continuously performed, it is preferable to adjust the speed to 1000 m/minute or more from the viewpoint of the productivity.

[Drawn Conjugated Fiber]

The drawn conjugated fiber having a thin fineness is obtained by performing the spinning step and the drawing step described above. The drawn conjugated fiber has preferably a fineness of 0.3 dTex or less, and a fiber strength of 5.5 cN/dTex or more. When such fibers are used for the non-woven fabric in a battery separator, excellent properties can be obtained.

The core material (the polypropylene) in the drawn conjugated fiber, obtained in the method for producing a drawn conjugated fiber of the present embodiment, has a degree of crystallinity of 35% or more, measured according to a heat of fusion method at a temperature elevation rate of 30° C./minute using a differential scanning calorimeter. A modulus of elasticity and the thermal stability of the fiber are improved by adjusting the degree of crystallinity of the core material to 35% or more. In addition, it is preferable to adjust the degree of crystallinity of the core material to 40% or more by addition of the nucleating agent described above, whereby the modulus of elasticity and the thermal stability of the drawn conjugated fiber can be further improved.

The degree of crystallinity of the core material in the drawn conjugated fiber defined herein refers to a value calculated from a heat of fusion of the core component fiber, measured using a differential scanning calorimeter (DSC). In calculation of the degree of crystallinity, a literature data (209 J/g) of the heat of fusion in the complete crystal of the resin forming the core material is defined as a degree of crystallinity of 100%. An amount of the drawn conjugated fiber to be measured is about 8 mg, and the measurement was performed by temperature elevation scanning at a temperature elevation rate of 30° C./minute from room temperature to 200° C.

When the melting point of the resin is measured using a DSC, the temperature elevation rate is generally set at 10° C./minute, but in a case where the heat of fusion of a substance in which oriented crystallization occurs such as a drawn product is measured and difference in the degree of crystallinity existing inside the fiber is obtained, if the temperature elevation rate is slow, then the crystallization proceeds during the temperature elevation, and as a result the heat of fusion, which is in a different state before the measurement, is measured. In the present embodiment, accordingly, the measurement is performed at the temperature elevation rate of 30° C./minute, and the degree of crystallinity of the core material is calculated from the measured value.

According to the method for producing a drawn conjugated fiber of the present embodiment, the MFR of the core material discharged from the spinneret and the ratio of the MFR of the core material discharged from the spinneret to the MFR of the sheath material discharged from the spinneret are adjusted to the specific ranges, and thus though the MFR of the core material discharged from the spinneret is within a relatively high range, the fineness unevenness among the undrawn fibers, the sheath-core ratio unevenness, and the uneven coating with the sheath material on the core material can be reduced, and the conjugated fiber having a thin fineness can be stably spun.

In a case where the spinning is performed using a large diameter die having a lot of nozzles (that is, nozzle holes) such as 1000 holes or more, particularly 1500 holes or more, in order to increase a production efficiency, a discharge pressure is reduced if the MFR of the resin discharged from the nozzles is high, thus resulting in the occurrence of the unevenness described above in the undrawn fibers to be spun. If the undrawn fibers having the unevenness are used, the good drawability cannot be obtained in the subsequent drawing step, and thus it is necessary to lower the draw ratio for performing the stable drawing, and it is difficult to obtain the drawn conjugated fiber having a thin fineness. On the other hand, according to the method for producing a drawn conjugated fiber of the present embodiment, both of the spinning and the drawing can be stably performed, because the MFR of the core material discharged from the spinneret and the ratio of the MFR of the core material discharged from the spinneret to the MFR of the sheath material discharged from the spinneret are adjusted to the specific ranges.

In a conjugated fiber described in Patent Document 2, MFRs of a core component and a sheath component, discharged from a spinneret, are appropriately selected, but the technique described in Patent Document 2 aims mainly at making a fiber strength stronger, and an MFR range of core materials discharged, described in Examples, is less than 70 g/10 minutes. For those reasons, the undrawn fiber having a thin fineness cannot be obtained in the method described in Patent Document 2, and the drawn conjugated fiber having a thin fineness and uniform cross-section cannot be produced.

EXAMPLES

The effects of the present invention are specifically explained below showing Examples of the present invention and Comparative Examples. In Examples, drawn conjugated fibers were produced and performances thereof were evaluated in the following methods and conditions.

[Raw Material]
(1) Core Material
  A: Isotactic Polypropylene "S119" (MFR=60 g/10 minutes, Q value=2.8) manufactured by Prime Polymer Co., Ltd.
  B: Isotactic Polypropylene "Y2000GV" (MFR=18 g/10 minutes, Q value=3.0) manufactured by Prime Polymer Co., Ltd.
  C: Isotactic Polypropylene "S135" (MFR=9 g/10 minutes, Q value=3.5) manufactured by Prime Polymer Co., Ltd.
  D: Isotactic Polypropylene "Y2005GP" (MFR=20 g/10 minutes, Q value=4.7) manufactured by Prime Polymer Co., Ltd.
(2) Sheath Material
  a: High Density Polyethylene "J302" (MFR=38 g/10 minutes, Q value=4.3) manufactured by Asahi Kasei Chemicals Corporation
  b: High Density Polyethylene "Evoleu SP-H" (MFR=47 g/10 minutes, Q value=2.2) manufactured by Prime Polymer Co., Ltd.
  c: High Density Polyethylene "S6932" (MFR=20 g/10 minutes, Q value=5.1) manufactured by Keiyo Polyethylene Co., Ltd.
(3) Additive
  I: "PP-RM11K4753N" manufactured by Dainichiseika Color & Chemicals Mfg. Co., Ltd.
  A masterbatch (calculated MFR=746 g/10 minutes) produced by blending a metallocene high MFR granular polypropylene "ACHIEVE 6936G1" (MFR=1550 g/10 minutes) manufactured by Exxon Mobil Corporation with a powdery polypropylene (MFR=40 g/10 minutes) in a mass ratio of 80:20, and kneading the mixture.
  II: Hydroxyamine Ester-based Radical Generator "IRGATEC CR76" manufactured by BASF Japan Ltd.
  III: Isotactic Polypropylene "S13B" (MFR=700 g/10 minutes, Q value=2.4) manufactured by Prime Polymer Co., Ltd.
  IV: Phosphoric Acid-2,2'-Methylenebis(4,6-di-tert-butylphenyl) Aluminum Salt "ADK STAB NA-21" manufactured by Adeka Corporation
  V: Dimethyl Benzylidene Sorbitol "GELOL MD" manufactured by New Japan Chemical Co., Ltd.

[Evaluation and Measurement Methods]
(1) Fiber Fineness

A fiber fineness of an undrawn fiber and a drawn fiber was measured in accordance with JIS L 1015.

(2) MFR

An MFR of each of a raw material pellet and a sheath and core fibrous substances discharged from a spinneret was measured in accordance with JIS K 7210-A method. The measurement conditions are shown as follows:

Polypropylene Resin Raw Material: Test Temperature: 230° C., Test Load: 21.18 N (Condition M).

Polyethylene Resin Raw Material: Test Temperature: 190° C., Test Load: 21.18 N (Condition D).

Fibrous Substance Discharged from Spinneret: Test Temperature: 230° C., Test Load: 21.18 N(Condition M).

Blend of Polypropylene Resin Raw Materials: obtained from the following numerical formula 1 and numerical formula 2. In the numerical formulae 1 and 2 described below, $w_i$ is a mass fraction of a forming component i, $MFR_i$ is a melt flow rate of a forming element i, and n is the total number of the forming components in the blend.

$$\log(MFR_{blend}) = w_1 \log(MFR_1) + w_2 \log(MFR_2) + \ldots + w_n \log(MFR_n) \quad \text{[Equation 1]}$$

$$w_1 + w_2 \ldots + w_n = 1 \quad \text{[Equation 2]}$$

(3) Draw Ratio

The maximum draw ratio at which drawing can be stably performed without fiber breakage, breakage by drawing, or fiber winding around a roller was determined.

(4) Strength of Fiber, Elongation, Young's Modulus

Measurement was performed in accordance with JIS L 1015.

(5) Dry Heat Shrinkage

Measurement was performed in accordance with JIS L 1015. In the test, a heat treatment temperature was adjusted to 120° C. and a heat treatment time was adjusted to 10 minutes.

(6) Degree of Crystallinity of Core Material

A degree of crystallinity of a core material in a drawn conjugated fiber was measured in the following procedures:

i: Preparation of Conjugated Fiber for Measurement

A drawn conjugated fiber was washed with a mixed solution of ethanol:methanol=2:1, and then it was air-dried at room temperature for 3 hours or more to remove adhering oil and water.

ii: Measurement of Endothermic Energy Amount

Using a differential scanning calorimeter (DSC-60), manufactured by Shimadzu Corporation, the drawn conjugated fiber, prepared in i was weighed to give a mass of 8.0±0.3 mg, and it was enclosed in an aluminum cell for measuring a heat of fusion. Then, the temperature was elevated at a temperature elevation rate of 30° C./minute from room temperature to 200° C. in a nitrogen atmosphere, and an endothermic energy amount (mJ) of each of a sheath material (polyethylene) and a core material (polypropylene) in the drawn conjugated fiber was measured.

iii: Calculation of Heat of Fusion of Core Material

When a heat of fusion $\Delta H_{PP}$ (J/g) of the core material (polypropylene) was calculated, first, a mass (mg) of the sheath material (polyethylene) and the core material (polypropylene) was calculated from a mass (mg) of the drawn conjugated fiber used for the measurement and a ratio of the sheath to the core (cross-sectional ratio). Then, the endothermic energy amount $H_{PP}$ (mJ) of the core material was divided by the mass of the core material to calculate a heat of fusion $\Delta H_{PP}$ of the core material.

iv: Calculation of Degree of Crystallinity

A degree of crystallinity $X_{PPC}$ (%) of the core material (polypropylene) was calculated by the following numerical formula 3 using the heat of fusion $\Delta H_{PP}$ of the core material calculated in iii. The $\Delta H_{PPC}$ in the numerical formula 3 described below is a heat of fusion of a complete polypropylene crystal, and in the present Examples, it was defined as 209 J/g based on the literature (J. Brandrup & E. H. Immergut: Polymer Handbook (2nd. Ed.), John Wiley & Sons, New York (1975) V-24).

$$X_{PPC}(\%) = (\Delta H_{PP}/\Delta H_{PPC}) \times 100 \quad \text{[Equation 3]}$$

Example 1

(1) Production of Sheath-Core Undrawn Conjugated Fiber

Undrawn fibers having a core-sheath structure were produced using a raw material in which 7.5% by mass of the additive I was added to the core material A, and the sheath material a. At that time, a sheath-core composite spinneret was used, and a cross-sectional ratio of the sheath to the core (sheath/core) was adjusted to 40/60. Spinning conditions were adjusted as follows: an extruder cylinder temperature of a core material was 275° C.; an extruder cylinder temperature of a sheath material was 255° C.; a spinneret temperature was 270° C., and a spinning speed was 600 m/minute. Under the conditions described above, undrawn fibers having a fineness of 0.67 dTex were spun. The core material, discharged from the spinneret, had an MFR of 84.4 g/10 minutes, the sheath material had an MFR of 72.6 g/10 minutes, and an MFR ratio (=the core material MFR/the sheath material MFR) was 1.16.

(2) Production of Drawn Conjugated Fiber

A two-stage drawing apparatus was prepared in which a pre-drawing bath (a first stage, warm water), and a main drawing bath (a second stage, pressurized saturated steam) were continuously arranged between three rollers. First, immediately after 400 undrawn fibers (about 540,000 dTex), obtained in a spinning step, were prepared, collected tows were subjected to a pre-drawing treatment in the pre-drawing bath under conditions of a guide roller (G1 roller) speed of 10 m/minute, and a pre-drawing delivery roller (G2 roller) speed of 29 m/minute in warm water of 93° C. After that, a speed of a drawing fiber taking-out roller (G3 roller) was continuously increased, and the main drawing in a second stage was performed in pressurized saturated steam of 124° C.

As a result, a speed of the drawing fiber taking-out roller (G3 roller), capable of industrially stable drawing without causing the fiber breakage or the breakage by drawing was 50 m/minute, and a total draw ratio was 5.0 times. The drawn conjugated fiber obtained in Example 1 had a fineness of 0.15 dTex, and had sufficient fiber physical properties.

Example 2

(1) Production of Sheath-Core Undrawn Conjugated Fiber

Undrawn fibers having a core-sheath structure were produced using a raw material in which 15% by mass of the additive I was added to the core material A, and the sheath material a. At that time, a sheath-core composite spinneret was used, and a cross-sectional ratio of the sheath to the core (sheath/core) was adjusted to 40/60. Spinning conditions were adjusted as follows: an extruder cylinder temperature of a core material was 270° C.; an extruder cylinder temperature of a sheath material was 255° C.; a spinneret temperature was 260° C.; and a spinning speed was 600 m/minute. Under the conditions described above, undrawn fibers having a fineness of 0.67 dTex were spun. The core material, discharged from the spinneret, had an MFR of 91.1 g/10 minutes, the sheath material had an MFR of 71.8 g/10 minutes, and an MFR ratio (=the core material MFR/the sheath material MFR) was 1.27. FIG. 2 is a photomicrograph showing cross-sections of the undrawn fibers from Example 2.

(2) Production of Drawn Conjugated Fiber

Immediately after 400 undrawn fibers (about 540,000 dTex), obtained in a spinning step, were prepared, collected tows were subjected to the pre-drawing treatment and then continuously subjected to the main drawing in the same manner and the same conditions as in Example 1.

As a result, a speed of the drawing fiber taking-out roller (G3 roller), capable of industrially stable drawing without causing the fiber breakage or the breakage by drawing was 53 m/minute, and a total draw ratio was 5.3 times. It can be considered that, in Example 2, the MFR of the core material was increased compared to Example 1, and thus the roller speed and the total draw ratio were improved. The obtained drawn conjugated fiber had a fineness of 0.13 dTex, and had sufficient fiber physical properties.

Example 3

(1) Production of Sheath-Core Undrawn Conjugated Fiber

Undrawn fibers were produced in the same manner and the same conditions as in Example 2.

(2) Production of Drawn Conjugated Fiber

A two-stage drawing apparatus was prepared in which a pre-drawing bath (a first stage, warm water), and a main drawing bath (a second stage, steam with ordinary pressure) were continuously arranged between three rollers. First, immediately after 400 undrawn fibers (about 540,000 dTex), obtained in a spinning step, were prepared, collected tows were subjected to a pre-drawing treatment in the pre-drawing bath under conditions of a guide roller (G1 roller) speed of 10 m/minute, and a pre-drawing delivery roller (G2 roller) speed of 35 m/minute in warm water of 93° C. After that, a speed of a drawing fiber taking-out roller (G3 roller) was continuously increased, and the main drawing in a second stage was performed in steam with ordinary pressure of 100° C.

As a result, a speed of the drawing fiber taking-out roller (G3 roller), capable of industrially stable drawing without causing the fiber breakage or the breakage by drawing was 37 m/minute, and a total draw ratio was 3.7 times. As the main drawing temperature in the second stage was lower than that in Example 2, the draw ratio was decreased, but the obtained drawn conjugated fiber had a fineness of 0.19 dTex, and had sufficient fiber physical properties. The core material had a heat of fusion $\Delta H_{PP}$ of 74.0 J/g, measured at a temperature elevation rate of 30° C./minute using a differential scanning calorimeter, and had a degree of crystallinity of 35.4%.

Example 4

(1) Production of Sheath-Core Undrawn Conjugated Fiber

Undrawn fibers having a core-sheath structure were produced using a raw material in which 15% by mass of the additive I and 0.3% by mass of the additive IV (the metal salt of phosphate ester-based nucleating agent) were added to the core material A, and the sheath material a. At that time, a sheath-core composite spinneret was used, and a cross-sectional ratio of the sheath to the core (sheath/core) was adjusted to 40/60. Spinning conditions were adjusted as follows: an extruder cylinder temperature of a core material was 270° C.; an extruder cylinder temperature of a sheath material was 255° C.; a spinneret temperature was 260° C.; and a spinning speed was 600 m/minute. Under the conditions described above, undrawn fibers having a fineness of 0.67 dTex were spun. The core material, discharged from the spinneret, had an MFR of 91.9 g/10 minutes, the sheath material had an MFR of 72.5 g/10 minutes, and an MFR ratio (=the core material MFR/the sheath material MFR) was 1.27.

FIG. 3 is a photomicrograph showing cross-sections of the undrawn fibers from Example 4. As shown in FIG. 3, it was confirmed that, in the undrawn fibers from Example 4 in which the nucleating agent was added, the fineness (thickness) unevenness among the fibers is smaller, and the sheath to core ratio unevenness in the single fiber and the uneven coating with the sheath material were more reduced, compared to the undrawn fibers from Example 2 in which the nucleating agent was not added, shown in FIG. 2.

(2) Production of Drawn Conjugated Fiber

Immediately after 400 undrawn fibers (about 540,000 dTex), obtained in a spinning step, were prepared, collected tows were subjected to the pre-drawing treatment and then continuously subjected to the main drawing in the same manner and the same conditions as in Example 1.

As a result, a speed of the drawing fiber taking-out roller (G3 roller), capable of industrially stable drawing without causing the fiber breakage or the breakage by drawing was 55 m/minute, and a total draw ratio was 5.5 times. The reason why the roller speed and the total draw ratio were more improved in Example 4 compared to Example 2 can be considered that the addition of the crystalline nucleating agent to the core material stabilized the cooling of the resin discharged from the spinneret, and further the fineness unevenness was reduced, the sheath to core ratio unevenness and the uneven coating with the sheath material were also reduced, and fine crystals were generated and a crystal structure easily drawn was formed. The obtained drawn conjugated fiber had a fineness of 0.12 dTex, and had sufficient fiber physical properties. The core material had a heat of fusion $\Delta H_{PP}$ of 99.5 J/g, measured at a temperature elevation rate of 30° C./minute using a differential scanning calorimeter, and had a degree of crystallinity of 47.6%. The addition of the nucleating agent increased the Young's modulus of elasticity and decreased the heat shrinkage, and thus the drawn conjugated fiber had excellent fiber physical properties.

Example 5

(1) Production of Sheath-Core Undrawn Conjugated Fiber

Undrawn fibers having a core-sheath structure were produced using a raw material in which 7.5% by mass of the additive I and 0.1% by mass of the additive II were added to the core material A, and the sheath material a. At that time, a sheath-core composite spinneret was used, and a cross-sectional ratio of the sheath to the core (sheath/core) was adjusted to 40/60. Spinning conditions were adjusted as follows: an extruder cylinder temperature of a core material was 255° C.; an extruder cylinder temperature of a sheath material was 255° C.; a spinneret temperature was 270° C.; and a spinning speed was 600 m/minute. Under the conditions described above, undrawn fibers having a fineness of 0.67 dTex were spun. The core material, discharged from the spinneret, had an MFR of 112.7 g/10 minutes, the sheath material had an MFR of 73.4 g/10 minutes, and an MFR ratio (=the core material MFR/the sheath material MFR) was 1.54.

FIG. 4 is a photomicrograph showing cross-sections of the undrawn fibers from Example 5. As shown in FIG. 4, because the nucleating agent was not added to undrawn fibers in Example 5, the sheath to core ratio unevenness and the uneven coating with the sheath material were observed in some of single fibers.

(2) Production of Drawn Conjugated Fiber

Immediately after 400 undrawn fibers (about 540,000 dTex), obtained in a spinning step, were prepared, collected tows were subjected to the pre-drawing treatment and then continuously subjected to the main drawing in the same manner and the same conditions as in Example 1.

As a result, a speed of the drawing fiber taking-out roller (G3 roller), capable of industrially stable drawing without causing the breakage by drawing was 58 m/minute, and a total draw ratio was 5.8 times. It can be considered that, in Example 5, the additive I whose MFR was high, added to the core material, was further decomposed by the additive II to serve as a plasticizer, and thus the roller speed and the total draw ratio were improved. The obtained drawn conjugated fiber had a fineness of 0.12 dTex and had sufficient fiber physical properties.

Example 6

(1) Production of Sheath-Core Undrawn Conjugated Fiber

Undrawn fibers having a core-sheath structure were produced using a resin raw material in which 7.5% by mass of the additive I and 0.1% by mass of the additive II were added to the core material A, and the sheath material a. At that time, a sheath-core composite spinneret was used, and a cross-sectional ratio of the sheath to the core (sheath/core) was adjusted to 50/50. Spinning conditions were adjusted as follows: an extruder cylinder temperature of a core material was 255° C.; an extruder cylinder temperature of a sheath material was 255° C.; a spinneret temperature was 270° C.; and a spinning speed was 700 m/minute. Under the conditions described above, undrawn fibers having a fineness of 0.46 dTex were spun. The core material, discharged from the spinneret, had an MFR of 120.5 g/10 minutes, the sheath material had an MFR of 72.1 g/10 minutes, and an MFR ratio (=the core material MFR/the sheath material MFR) was 1.67.

(2) Production of Drawn Conjugated Fiber

Immediately after 400 undrawn fibers (about 370,000 dTex), obtained in a spinning step, were prepared, collected tows were subjected to the pre-drawing treatment and then continuously subjected to the main drawing in the same manner and the same conditions as in Example 1.

As a result, a speed of the drawing fiber taking-out roller (G3 roller), capable of industrially stable drawing without causing the breakage by drawing was 52 m/minute, and a total draw ratio was 5.2 times. The obtained drawn conjugated fiber had a fineness of 0.09 dTex, and had sufficient fiber physical properties.

Example 7

(1) Production of Sheath-Core Undrawn Conjugated Fiber

Undrawn fibers having a core-sheath structure were produced using a resin raw material in which 7.5% by mass of the additive I and 0.1% by mass of the additive II were added to the core material A, and the sheath material a. At that time, a sheath-core composite spinneret was used, and a cross-sectional ratio of the sheath to the core (sheath/core) was adjusted to 30/70. Spinning conditions were adjusted as follows: an extruder cylinder temperature of a core material was 255° C.; an extruder cylinder temperature of a sheath material was 255° C.; a spinneret temperature was 270° C.; and a spinning speed was 600 m/minute. Under the conditions described above, undrawn fibers having a fineness of 0.63 dTex were spun. The core material, discharged from the spinneret, had an MFR of 116.5 g/10 minutes, the sheath material had an MFR of 70.2 g/10 minutes, and an MFR ratio (=the core material MFR/the sheath material MFR) was 1.66.

(2) Production of Drawn Conjugated Fiber

Immediately after 400 undrawn fibers (about 500,000 dTex), obtained in a spinning step, were prepared, collected tows were subjected to the pre-drawing treatment and then continuously subjected to the main drawing in the same manner and the same conditions as in Example 1.

As a result, a speed of the drawing fiber taking-out roller (G3 roller), capable of industrially stable drawing without causing the breakage by drawing was 62 m/minute, and a total draw ratio was 6.2 times. It can be considered that, in Example 7, the ratio of the core material was raised, and thus the roller speed and the total draw ratio were improved. The obtained drawn conjugated fiber had a fineness of 0.11 dTex, and had sufficient fiber physical properties.

Example 8

(1) Production of Sheath-Core Undrawn Conjugated Fiber

Undrawn fibers having a core-sheath structure were produced using a resin raw material in which 0.5% by mass of the additive II was added to the core material B, and the sheath material a. At that time, a sheath-core composite spinneret was used, and a cross-sectional ratio of the sheath to the core (sheath/core) was adjusted to 40/60. Spinning conditions were adjusted as follows: an extruder cylinder temperature of a core material was 255° C.; an extruder cylinder temperature of a sheath material was 255° C.; a spinneret temperature was 270° C.; and a spinning speed was 600 m/minute. Under the conditions described above, undrawn fibers having a fineness of 0.67 dTex were spun. The core material, discharged from the spinneret, had an MFR of 140.5 g/10 minutes, the sheath material had an MFR of 69.9 g/10 minutes, and an MFR ratio (=the core material MFR/the sheath material MFR) was 2.01.

(2) Production of Drawn Conjugated Fiber

Immediately after 400 undrawn fibers (about 540,000 dTex), obtained in a spinning step, were prepared, collected tows were subjected to the pre-drawing treatment and then continuously subjected to the main drawing in the same manner and the same conditions as in Example 1.

In the present Example, the core material B whose MFR was smaller than that of the core material A used in Examples 5 to 7 was used, but the addition amount of the additive II was larger than that in Examples 5 to 7, and thus the MFR of the core material, discharged from the spinneret, was large, which could be within the range of the present invention. As a result, a speed of the drawing fiber taking-out roller (G3 roller), capable of industrially stable drawing without causing the breakage by drawing was 55 m/minute, and a total draw ratio was 5.5 times. The obtained drawn conjugated fiber had a fineness of 0.13 dTex, and had sufficient fiber physical properties.

Example 9

(1) Production of Sheath-Core Undrawn Conjugated Fiber

Undrawn fibers having a core-sheath structure were produced using a resin raw material in which 0.7% by mass of the additive II was added to the core material C, and the sheath material a. At that time, a sheath-core composite spinneret was used, and a cross-sectional ratio of the sheath to the core (sheath/core) was adjusted to 40/60. Spinning conditions were adjusted as follows: an extruder cylinder temperature of a core material was 255° C.; an extruder cylinder temperature of a sheath material was 255° C.; a spinneret temperature was 270° C.; and a spinning speed was 600 m/minute. Under the conditions described above, undrawn fibers having a fineness of 0.67 dTex were spun. The core material, discharged from the spinneret had an MFR of 156.9 g/10 minutes, the sheath material had a MFR of 72.4 g/10 minutes, and an MFR ratio (=the core material MFR/the sheath material MFR) was 2.17.

(2) Production of Drawn Conjugated Fiber

Immediately after 400 undrawn fibers (about 540,000 dTex), obtained in a spinning step, were prepared, collected tows were subjected to the pre-drawing treatment and then continuously subjected to the main drawing in the same manner and the same conditions as in Example 1.

In the present Example, the core material C whose MFR was particularly small was used, but the addition amount of the additive II was larger than that in Examples 5 to 8, and thus the MFR of the core material discharged from the spinneret was large, which could be within the range of the present invention. As a result, a speed of the drawing fiber taking-out roller (G3 roller), capable of industrially stable drawing without causing the breakage by drawing was 53 m/minute, and a total draw ratio was 5.3 times. The obtained drawn conjugated fiber had a fineness of 0.14 dTex, and had sufficient fiber physical properties.

Example 10

(1) Production of Sheath-Core Undrawn Conjugated Fiber

Undrawn fibers having a core-sheath structure were produced using a resin raw material obtained by mixing the core material A with the core material B in a mass ratio of 1:1 to give a mixture having a molecular weight distribution widened artificially and adding 0.4% by mass of the additive II to the mixture, and the sheath material a. At that time, a sheath-core composite spinneret was used, and a cross-sectional ratio of the sheath to the core (sheath/core) was adjusted to 40/60. Spinning conditions were adjusted as follows: an extruder cylinder temperature of a core material was 255° C.; an extruder cylinder temperature of a sheath material was 255° C.; a spinneret temperature was 270° C.; and a spinning speed was 600 m/minute. Under the conditions described above, undrawn fibers having a fineness of 0.67 dTex were spun. The core material, discharged from the spinneret, had an MFR of 137.8 g/10 minutes, the sheath material had an MFR of 70.5 g/10 minutes, and an MFR ratio (=the core material MFR/the sheath material MFR) was 1.95.

(2) Production of Drawn Conjugated Fiber

Immediately after 400 undrawn fibers (about 540,000 dTex), obtained in a spinning step, were prepared, collected tows were subjected to the pre-drawing treatment and then continuously subjected to the main drawing in the same manner and the same conditions as in Example 1.

In the present Example, the molecular weight distribution of the core material was wide, and thus a speed of the drawing fiber taking-out roller (G3 roller), capable of industrially stable drawing without causing the breakage by drawing was 52 m/minute, and a total draw ratio was 5.2 times. The obtained drawn conjugated fiber had a fineness of 0.14 dTex, and had sufficient fiber physical properties.

Example 11

(1) Production of Sheath-Core Undrawn Conjugated Fiber

Undrawn fibers having a core-sheath structure were produced using a resin raw material in which 10% by mass of the additive I and 0.3% by mass of the additive II were added to the core material B and the sheath material a. At that time, a sheath-core composite spinneret was used, and a cross-sectional ratio of the sheath to the core (sheath/core) was adjusted to 40/60. Spinning conditions were adjusted as follows: an extruder cylinder temperature of a core material was 255° C.; an extruder cylinder temperature of a sheath material was 255° C.; a spinneret temperature was 270° C.; and a spinning speed was 600 m/minute. Under the conditions described above, undrawn fibers having a fineness of 0.67 dTex were spun. The core material, discharged from the spinneret, had an MFR of 148.7 g/10 minutes, the sheath material had an MFR of 71.5 g/10 minutes, and an MFR ratio (=the core material MFR/the sheath material MFR) was 2.08.

(2) Production of Drawn Conjugated Fiber

Immediately after 400 undrawn fibers (about 540,000 dTex), obtained in a spinning step, were prepared, collected tows were subjected to the pre-drawing treatment and then continuously subjected to the main drawing in the same manner and the same conditions as in Example 1.

As a result, a speed of the drawing fiber taking-out roller (G3 roller), capable of industrially stable drawing without causing the breakage by drawing was 57 m/minute, and a total draw ratio was 5.7 times. It can be considered that, in Example 11, the additive I whose MFR was high, added to the core material, was further decomposed by the additive II to serve as a plasticizer, and thus the good drawability was obtained. The obtained drawn conjugated fiber had a fineness of 0.12 dTex, and had sufficient fiber physical properties.

Example 12

(1) Production of Sheath-Core Undrawn Conjugated Fiber

Undrawn fibers having a core-sheath structure were produced using a resin raw material in which 7.5% by mass of the additive I and 0.1% by mass of the additive II were added to the core material A, and the sheath material a. At that time, a sheath-core composite spinneret was used, and a cross-sectional ratio of the sheath to the core (sheath/core) was adjusted to 40/60. Spinning conditions were adjusted as follows: an extruder cylinder temperature of a core material was 255° C.; an extruder cylinder temperature of a sheath material was 255° C.; a spinneret temperature was 270° C.; and a spinning speed was 600 m/minute. Under the conditions described above, undrawn fibers having a fineness of 0.67 dTex were spun. The core material, discharged from the spinneret, had an MFR of 109.6 g/10 minutes, the sheath material had an MFR of 76.3 g/10 minutes, and an MFR ratio (=the core material MFR/the sheath material MFR) was 1.44.

(2) Production of Drawn Conjugated Fiber

Immediately after 400 undrawn fibers (about 540,000 dTex), obtained in a spinning step, were prepared, collected tows were subjected to the pre-drawing treatment and then continuously subjected to the main drawing in the same manner and the same conditions as in Example 1.

As a result, a speed of the drawing fiber taking-out roller (G3 roller), capable of industrially stable drawing without causing the breakage by drawing was 58 m/minute, and a total draw ratio was 5.8 times. It can be considered that, in Example 12, the additive I whose MFR was high, added to the core material, was further decomposed by the additive II to serve as a plasticizer, and thus the good drawability was obtained. The obtained drawn conjugated fiber had a fineness of 0.12 dTex, and had sufficient fiber physical properties.

Example 13

(1) Production of Sheath-Core Undrawn Conjugated Fiber

Undrawn fibers having a core-sheath structure were produced using a resin raw material in which 7.5% by mass of the additive I and 0.1% by mass of the additive II were added to the core material A, and the sheath material a. At that time, a sheath-core composite spinneret was used, and a cross-sectional ratio of the sheath to the core (sheath/core) was adjusted to 50/50. Spinning conditions were adjusted as follows: an extruder cylinder temperature of a core material was 255° C.; an extruder cylinder temperature of a sheath material was 255° C.; a spinneret temperature was 270° C.; and a spinning speed was 150 m/minute. Under the conditions described above, undrawn fibers having a fineness of 0.45 dTex were spun. The core material, discharged from the spinneret, had an MFR of 128.9 g/10 minutes, the sheath material had an MFR of 71.8 g/10 minutes, and an MFR ratio (=the core material MFR/the sheath material MFR) was 1.80.

(2) Production of Drawn Conjugated Fiber

A two-stage drawing apparatus was used in which a pre-drawing bath (a first stage, steam with ordinary pressure), and a main drawing bath (a second stage, pressurized saturated steam) were continuously arranged between three rollers so that the drawing step could be continuously performed from the spinning step described above. First, subsequently to the spinning step, the undrawn fibers (about 15,000 dTex), obtained in the spinning step, were subjected to a pre-drawing treatment in a pre-drawing bath at 100° C. using steam with ordinary pressure under conditions of a guide roller (G1 roller) speed of 150 m/minute and a pre-drawing delivery roller (G2 roller) speed of 750 m/minute. Subsequently, a speed of a drawing fiber taking-out roller (G3 roller) was increased, and the main drawing in a second stage was performed in pressurized saturated steam of 124° C.

As a result, a speed of the drawing fiber taking-out roller (G3 roller), capable of industrially stable drawing without causing the fiber breakage or the breakage by drawing was 1200 m/minute, and a total draw ratio was 8.0 times. The obtained drawn conjugated fiber had a fineness of 0.06 dTex, and had sufficient fiber physical properties.

Example 14

(1) Production of Sheath-Core Undrawn Conjugated Fiber

Undrawn fibers having a core-sheath structure were produced using the core material A and the sheath material a. At that time, a sheath-core composite spinneret was used, and a cross-sectional ratio of the sheath to the core (sheath/core) was adjusted to 40/60. Spinning conditions were adjusted as follows: an extruder cylinder temperature of a core material was 295° C.; an extruder cylinder temperature of a sheath material was 255° C.; a spinneret temperature was 270° C.; and a spinning speed was 500 m/minute. undrawn fibers having a fineness of 1.10 dTex were spun, while adjusting an amount of the resin discharged. The core material, discharged from the spinneret, had an MFR of 75.8 g/10 minutes, the sheath material had an MFR of 71.8 g/10 minutes, and an MFR ratio (=the core material MFR/the sheath material MFR) was 1.06.

(2) Production of Drawn Conjugated Fiber

A two-stage drawing apparatus was prepared in which a pre-drawing bath (a first stage, warm water), and a main drawing bath (a second stage, pressurized saturated steam) were continuously arranged between three rollers. First, immediately after 250 undrawn fibers (about 550,000 dTex), obtained in a spinning step, were prepared, collected tows were subjected to a pre-drawing treatment in the pre-drawing bath under conditions of a guide roller (G1 roller) speed of 10 m/minute and a pre-drawing delivery roller (G2 roller) speed of 29 m/minute in warm water of 93° C. After that, a speed of a drawing fiber taking-out roller (G3 roller) was continuously increased, and the main drawing in a second stage was performed in pressurized saturated steam of 124° C.

As a result, a speed of the drawing fiber taking-out roller (G3 roller), capable of industrially stable drawing without causing the fiber breakage or the breakage by drawing was 55 m/minute, and a total draw ratio was 5.5 times. The obtained drawn conjugated fiber in additional Example had a fineness of 0.20 dTex, and had sufficient fiber physical properties.

Example 15

(1) Production of Sheath-Core Undrawn Conjugated Fiber

Undrawn fibers having a core-sheath structure were produced using a resin raw material in which 10% by mass of the additive I was added to the core material A, and the sheath material a. At that time, a sheath-core composite spinneret was used, and a cross-sectional ratio of the sheath to the core (sheath/core) was adjusted to 45/55. Spinning conditions were adjusted as follows: an extruder cylinder temperature of a core material was 260° C.; an extruder cylinder temperature of a sheath material was 260° C.; a spinneret temperature was 270° C.; and a spinning speed was 250 m/minute. Under the conditions described above, undrawn fibers having a fineness of 0.6 dTex were spun. The core material, discharged from the spinneret, had an MFR of 88.9 g/10 minutes, the sheath material had an MFR of 72.5 g/10 minutes, and an MFR ratio (=the core material MFR/the sheath material MFR) was 1.23.

(2) Production of Drawn Conjugated Fiber

A two-stage drawing apparatus was used in which a first drawing bath (a first stage, steam with ordinary pressure), and a second drawing bath (a second stage, steam with ordinary pressure) were continuously arranged between three rollers so that the drawing step could be continuously performed from the spinning step described above. Subsequently to the spinning step, the undrawn fibers (about 20,000 dTex), obtained in the spinning step, were subjected to a two-stage drawing using steam with ordinary pressure of 100° C., in the first drawing bath under conditions of, a guide roller (G1 roller) speed of 250 m/minute, and a second stage drawing ratio (G3/G2) in a first drawn delivery roller (G2 roller) and a drawing fiber taking-out roller (G3 roller) of 1.05 times, while the speed of the first drawing delivery roller (G2 roller) was increased.

As a result, a speed of the drawing fiber taking-out roller (G3 roller), capable of industrially stable drawing without causing the fiber breakage or the breakage by drawing was 1075 m/minute, and a total draw ratio was 4.3 times. The obtained drawn conjugated fiber had a fineness of 0.15 dTex, and had sufficient fiber physical properties.

Example 16

(1) Production of Sheath-Core Undrawn Conjugated Fiber

Undrawn fibers having a core-sheath structure were produced using a resin raw material in which 20% by mass of the additive III was added to the core material A, and the sheath material a. At that time, a sheath-core composite spinneret was used, and a cross-sectional ratio of the sheath to the core (sheath/core) was adjusted to 45/55. Spinning conditions were adjusted as follows: an extruder cylinder temperature of a core material was 260° C.; an extruder cylinder temperature of a sheath material was 260° C.; a spinneret temperature was 270° C.; and a spinning speed was 250 m/minute. Under the conditions described above, undrawn fibers having a fineness of 0.6 dTex were spun. The core material, discharged from the spinneret, had an MFR of 96.8 g/10 minutes, the sheath material had an MFR of 72.8 g/10 minutes, and an MFR ratio (=the core material MFR/the sheath material MFR) was 1.33.

A two-stage drawing apparatus was used in which a first drawing bath (a first stage, steam with ordinary pressure), and a second drawing bath (a second stage, steam with ordinary pressure) were continuously arranged between three rollers so that the drawing step could be continuously performed from the spinning step described above. Subsequently to the spinning step, the undrawn fibers (about 20,000 dTex), obtained in the spinning step, were subjected to a two-stage drawing using steam with ordinary pressure of 100° C., in the first drawing bath under conditions of, a guide roller (G1 roller) speed of 250 m/minute, and a second stage drawing ratio (G3/G2) in a first drawn delivery roller (G2 roller) and a drawing fiber taking-out roller (G3 roller) of 1.05 times, while the speed of the first drawing delivery roller (G2 roller) was increased.

As a result, a speed of the drawing fiber taking-out roller (G3 roller), capable of industrially stable drawing without causing the fiber breakage or the breakage by drawing was 1000 m/minute, and a total draw ratio was 4.0 times. Although the fibers from Example 16 wherein the additive III was added had a drawability slightly lower than that of the fiber from Example 15, the obtained drawn conjugated fiber had a fineness of 0.17 dTex, and had sufficient fiber physical properties.

Example 17

(1) Production of Sheath-Core Undrawn Conjugated Fiber

Undrawn fibers having a core-sheath structure were produced using a resin raw material in which 20% by mass of the additive III and 0.2% of the additive IV (the metal salt of phosphate ester-based nucleating agent) were added to the core material A, and the sheath material a. At that time, a sheath-core composite spinneret was used, and a cross-sectional ratio of the sheath to the core (sheath/core) was adjusted to 50/50. Spinning conditions were adjusted as follows: an extruder cylinder temperature of a core material was 260° C.; an extruder cylinder temperature of a sheath material was 260° C.; a spinneret temperature was 270° C.; and a spinning speed was 250 m/minute. Under the conditions described above, undrawn fibers having a fineness of 0.6 dTex were spun. The core material, discharged from the spinneret, had an MFR of 97.5 g/10 minutes, the sheath material had an MFR of 73.5 g/10 minutes, and an MFR ratio (=the core material MFR/the sheath material MFR) was 1.33.

(2) Production of Drawn Conjugated Fiber

A two-stage drawing apparatus was used in which a first drawing bath (a first stage, steam with ordinary pressure) and a second drawing bath (a second stage, steam with ordinary pressure) were continuously arranged between three rollers so that the drawing step could be continuously performed after the spinning step described above. Subsequently to the spinning step, the undrawn fibers (about 20,000 dTex), obtained in the spinning step, were subjected to a two-stage drawing using steam with ordinary pressure of 100° C., in the first drawing bath under conditions of, a guide roller (G1 roller) speed of 250 m/minute, and a second stage drawing ratio (G3/G2) in a first drawn delivery roller (G2 roller) and a drawing fiber taking-out roller (G3 roller) of 1.05 times, while the speed of the first drawing delivery roller (G2 roller) was increased.

As a result, a speed of the drawing fiber taking-out roller (G3 roller), capable of industrially stable drawing without causing the fiber breakage or the breakage by drawing was 1125 m/minute, and a total draw ratio was 4.5 times. In Example 17, because the additive IV (the metal salt of phosphate ester-based nucleating agent) was added, fine crystals were generated, whereby a crystal structure capable of easily being drawn was formed and the drawability was improved, compared to Example 16. The obtained drawn conjugated fiber had a fineness of 0.14 dTex, and had sufficient fiber physical properties. Furthermore, the polypropylene fiber component had a heat of fusion $\Delta H_{PP}$ of 90.2 J/g measured at a temperature elevation rate of 30° C./minute using a differential scanning calorimeter, and a degree of crystallinity of 43.2%. The addition of the nucleating agent increased the Young's modulus of elasticity and decreased the heat shrinkage, and the drawn conjugated fiber having excellent fiber physical properties was obtained.

Example 18

(1) Production of Sheath-Core Undrawn Conjugated Fiber

Undrawn fibers having a core-sheath structure were produced using a resin raw material in which 20% by mass of the additive III and 0.3% of the additive IV (the metal salt of phosphate ester-based nucleating agent) were added to the core material A, and the sheath material a. At that time, a sheath-core composite spinneret was used, and a cross-sectional ratio of the sheath to the core (sheath/core) was adjusted to 50/50. Spinning conditions were adjusted as follows: an extruder cylinder temperature of a core material was 260° C.; an extruder cylinder temperature of a sheath material was 260° C.; a spinneret temperature was 270° C.; and a spinning speed was 250 m/minute. Under the conditions described above, undrawn fibers having a fineness of 0.6 dTex were spun. The core material, discharged from the spinneret, had an MFR of 96.5 g/10 minutes, the sheath material had an MFR of 73.1 g/10 minutes, and an MFR ratio (=the core material MFR/the sheath material MFR) was 1.32.

(2) Production of Drawn Conjugated Fiber

A two-stage drawing apparatus was used in which a first drawing bath (a first stage, steam with ordinary pressure) and a second drawing bath (a second stage, steam with ordinary pressure) were continuously arranged between three rollers so that the drawing step could be continuously performed after the spinning step described above. Subsequently to the spinning step, the undrawn fibers (about 20,000 dTex), obtained in the spinning step, were subjected to a two-stage drawing using steam with ordinary pressure of 100° C., in the first drawing bath under conditions of, a guide roller (G1 roller) speed of 250 m/minute, and a second stage drawing ratio (G3/G2) in a first drawn delivery roller (G2 roller) and a drawing fiber taking-out roller (G3 roller) of 1.05 times, while the speed of the first drawing delivery roller (G2 roller) was increased.

As a result, a speed of the drawing fiber taking-out roller (G3 roller), capable of industrially stable drawing without causing the fiber breakage or the breakage by drawing was 1200 m/minute, and a total draw ratio was 4.8 times. In Example 18, the additive IV (the metal salt of phosphate ester-based nucleating agent) was added in a larger amount, whereby the number of crystal nuclei was increased, fine crystals were generated, a crystal structure capable of being easily drawn was formed, and the drawability was improved, compared to Example 17. The obtained drawn conjugated fiber had a fineness of 0.13 dTex, and had sufficient fiber physical properties.

Example 19

(1) Production of Sheath-Core Undrawn Conjugated Fiber

Undrawn fibers having a core-sheath structure were produced using a resin raw material in which 20% by mass of the additive III and 0.1% of the additive V (the benzylidene sorbitol-based nucleating agent) were added to the core material A, and the sheath material a. At that time, a sheath-core composite spinneret was used, and a cross-sectional ratio of the sheath to the core (sheath/core) was adjusted to 50/50. Spinning conditions were adjusted as follows: an extruder cylinder temperature of a core material was 260° C.; an extruder cylinder temperature of a sheath material was 260° C.; a spinneret temperature was 270° C.; and a spinning speed was 250 m/minute. Under the conditions described above, undrawn fibers having a fineness of 0.6 dTex were spun. The core material, discharged from the spinneret, had an MFR of 97.1 g/10 minutes, the sheath material had an MFR of 72.6 g/10 minutes, and an MFR ratio (=the core material MFR/the sheath material MFR) was 1.34.

(2) Production of Drawn Conjugated Fiber

A two-stage drawing apparatus was used in which a first drawing bath (a first stage, steam with ordinary pressure) and a second drawing bath (a second stage, steam with ordinary pressure) were continuously arranged between three rollers so that the drawing step could be continuously performed after the spinning step described above. Subsequently to the spinning step, the undrawn fibers (about 20,000 dTex), obtained in the spinning step, were subjected to a two-stage drawing using steam with ordinary pressure of 100° C., in the first drawing bath under conditions of, a guide roller (G1 roller) speed of 250 m/minute, and a second stage drawing ratio (G3/G2) in a first drawing delivery roller (G2 roller) and a drawing fiber taking-out roller (G3 roller) of 1.05 times, while the speed of the first drawing delivery roller (G2 roller) was increased.

As a result, a speed of the drawing fiber taking-out roller (G3 roller), capable of industrially stable drawing without causing the fiber breakage or the breakage by drawing was 1325 m/minute, and a total draw ratio was 5.3 times. Compared to the additive IV (the metal salt of phosphate ester-based nucleating agent) used in Examples 17 and 18, which is a dispersion-type crystal nucleating agent, according to the additive V (the benzylidene sorbitol-based) used in Example 19, which is a melting-type crystal nucleating agent, a very large amount of fine crystals were generated, and thus a crystal structure capable of being more easily drawn is formed and the drawability was improved. The obtained drawn conjugated fiber had a fineness of 0.12 dTex and had sufficient fiber physical properties. Furthermore, the polypropylene fiber component had a heat of fusion $\Delta H_{PP}$ of 94.2 J/g, measured at a temperature elevation rate of 30° C./minute using a differential scanning calorimeter, and a degree of crystallinity of 45.1%. The addition of the nucleating agent increased the Young's modulus of elasticity and decreased the heat shrinkage, and the drawn conjugated fiber having excellent fiber physical properties was obtained.

Example 20

(1) Production of Sheath-Core Undrawn Conjugated Fiber

Undrawn fibers having a core-sheath structure were produced using a resin raw material in which 20% by mass of the additive III and 0.2% of the additive V (the benzylidene sorbitol-based nucleating agent) were added to the core material A, and the sheath material a. At that time, a sheath-core composite spinneret was used, and a cross-sectional ratio of the sheath to the core (sheath/core) was adjusted to 50/50. Spinning conditions were adjusted as follows: an extruder cylinder temperature of a core material was 260° C.; an extruder cylinder temperature of a sheath material was 260° C.; a spinneret temperature was 270° C.; and a spinning speed was 250 m/minute. Under the conditions described above, undrawn fibers having a fineness of 0.6 dTex were spun. The core material, discharged from the spinneret, had an MFR of 98.4 g/10 minutes, the sheath material had an MFR of 74.2 g/10 minutes, and an MFR ratio (=the core material MFR/the sheath material MFR) was 1.33.

(2) Production of Drawn Conjugated Fiber

A two-stage drawing apparatus was used in which a first drawing bath (a first stage, steam with ordinary pressure), and a second drawing bath (a second stage, steam with ordinary pressure) were continuously arranged between three rollers so that the drawing step could be continuously performed after the spinning step described above. Subsequently to the spinning step, the undrawn fibers (about 20,000 dTex), obtained in the spinning step, were subjected to a two-stage drawing using steam with ordinary pressure of 100° C., in the first drawing bath under conditions of, a guide roller (G1 roller) speed of 250 m/minute, and a second stage drawing ratio (G3/G2) in a first drawing delivery roller (G2 roller) and a drawing fiber taking-out roller (G3 roller) of 1.05 times, while the speed of the first drawing delivery roller (G2 roller) was increased.

As a result, a speed of the drawing fiber taking-out roller (G3 roller), capable of industrially stable drawing without causing the fiber breakage or the breakage by drawing was 1450 m/minute, and a total draw ratio was 5.8 times. In Example 20, the amount of the additive V (the benzylidene sorbitol-based nucleating agent) was increased compared to Example 19, and thus the number of crystal nuclei was increased, fine crystals were generated, a crystal structure capable of being easily drawn was formed, and the drawability was improved. The obtained drawn conjugated fiber had a fineness of 0.11 dTex and had sufficient fiber physical properties.

Comparative Example 1

(1) Production of Sheath-Core Undrawn Conjugated Fiber

Undrawn fibers having a core-sheath structure were produced using the core material D and the sheath material c. At that time, a sheath-core composite spinneret was used, and a cross-sectional ratio of the sheath to the core (sheath/core) was adjusted to 50/50. Spinning conditions were adjusted as follows: an extruder cylinder temperature of a core material was 275° C.; an extruder cylinder temperature of a sheath material was 275° C.; a spinneret temperature was 290° C.; and a spinning speed was 500 m/minute. The formation of undrawn fibers having a thin fineness was attempted by adjusting an amount of the resin discharged.

However, the core material discharged from the spinneret had an MFR of 38.7 g/10 minutes, the sheath material had an MFR of 33.0 g/10 minutes, and an MFR ratio (=the core material MFR/the sheath material MFR) was 1.17. As the melt tension of the resin discharged from the spinneret was high in both of the core material and the sheath material, an undrawn fiber fineness capable of being stably spun reached only up to 3.11 dTex, although the spinning temperature was set at a high value.

(2) Production of Drawn Conjugated Fiber

Immediately after 70 undrawn fibers (about 560,000 dTex), obtained in a spinning step, were prepared, collected tows were subjected to the pre-drawing treatment and then continuously subjected to the main drawing in the same manner and the same conditions as in Example 1.

As a result, the core material, discharged from the spinneret, had an MFR smaller than the range defined in the present invention, and thus a speed of the drawing fiber taking-out roller (G3 roller), capable of industrially stable drawing without causing the breakage by drawing was 54 m/minute, and a total draw ratio was 5.4 times. The obtained drawn conjugated fiber had good fiber physical properties, but it was thick, i.e., a fineness of 0.60 dTex, because the fineness of the undrawn fibers was insufficient.

Comparative Example 2

(1) Production of Sheath-Core Undrawn Conjugated Fiber

Undrawn fibers having a core-sheath structure were produced using a resin raw material in which 7.5% by mass of the additive I and 0.1% of the additive II were added to the core material A, and the sheath material c. At that time, a sheath-core composite spinneret was used, and a cross-sectional ratio of the sheath to the core (sheath/core) was adjusted to 50/50. Spinning conditions were adjusted as follows: an extruder cylinder temperature of a core material was 255° C.; an extruder cylinder temperature of a sheath material was 255° C.; a spinneret temperature was 270° C.; and a spinning speed was 500 m/minute. The formation of undrawn fibers having a thin fineness was attempted by adjusting an amount of the resin discharged.

However, the core material, discharged from the spinneret, had an MFR of 105.7 g/10 minutes, the sheath material had an MFR of 33.5 g/10 minutes, and an MFR ratio (=the core material MFR/the sheath material MFR) was 3.16. As the melt tension of the resin of the sheath material discharged from the spinneret was high, an undrawn fiber fineness capable of being stably spun reached only up to 2.04 dTex.

(2) Production of Drawn Conjugated Fiber

Immediately after 130 undrawn fibers (about 530,000 dTex), obtained in a spinning step, were prepared, collected tows were subjected to the pre-drawing treatment and then continuously subjected to the main drawing in the same manner and the same conditions as in Example 1.

As a result, a speed of the drawing fiber taking-out roller (G3 roller), capable of industrially stable drawing without causing the breakage by drawing was 60 m/minute, and a total draw ratio was 6.0 times. However, because the ratio of the MFR of the core material, discharged from the spinneret, to the MFR of the sheath material was high and the undrawn fibers were thick, the obtained drawn conjugated fiber has a fineness of 0.35 dTex, which was thicker than those in Examples described above, though it had good fiber physical properties.

Comparative Example 3

(1) Production of Sheath-Core Undrawn Conjugated Fiber

Undrawn fibers having a core-sheath structure were produced using the core material A and the sheath material a. At that time, a sheath-core composite spinneret was used, and a cross-sectional ratio of the sheath to the core (sheath/core) was adjusted to 50/50. Spinning conditions were adjusted as follows: an extruder cylinder temperature of a core material was 255° C.; an extruder cylinder temperature of a sheath material was 255° C.; a spinneret temperature was 270° C.; and a spinning speed was 500 m/minute. The formation of undrawn fibers having a thin fineness was attempted by adjusting an amount of the resin discharged.

However, the core material, discharged from the spinneret, had an MFR of 69.6 g/10 minutes, the sheath material had an MFR of 71.5 g/10 minutes, and an MFR ratio (=the core material MFR/the sheath material MFR) was 0.97. As the melt tension of the resin of the core material discharged from the spinneret was slightly high, an undrawn fiber fineness capable of being stably spun reached only up to 1.61 dTex.

(2) Production of Drawn Conjugated Fiber

Immediately after 170 undrawn fibers (about 550,000 dTex), obtained in a spinning step, were prepared, collected tows were subjected to the pre-drawing treatment and then continuously subjected to the main drawing in the same manner and the same conditions as in Example 1.

As a result, a speed of the drawing fiber taking-out roller (G3 roller), capable of industrially stable drawing without causing the breakage by drawing was 62 m/minute, and a total draw ratio was 6.2 times. It can be considered that this is caused by the MFR value of the core material, discharged from the spinneret, being lower than the range defined by the present invention, and further by the thick undrawn fiber. On the other hand, the obtained drawn conjugated fiber had good fiber physical properties, but its fineness was 0.29 dTex, which was thicker than those in Examples described above.

Comparative Example 4

(1) Production of Sheath-Core Undrawn Conjugated Fiber

Undrawn fibers were produced in the same manner and the same conditions as in Comparative Example 3.

(2) Production of Drawn Conjugated Fiber

After 170 undrawn fibers (about 550,000 dTex), obtained in a spinning step, were left untouched for about 2 days, collected tows were subjected to the pre-drawing treatment and then continuously subjected to the main drawing in the same manner and the same conditions as in Example 1.

As a result, a speed of the drawing fiber taking-out roller (G3 roller), capable of industrially stable drawing without causing the breakage by drawing was 55 m/minute, and a total draw ratio was 5.5 times. The drawability was lower than that in Comparative Example 3. This can be considered to be because crystals grew while the undrawn fibers were left for about 2 days, thereby resulting in the formation of a crystal structure which was difficult to draw. On the other hand, the obtained drawn conjugated fiber had good fiber physical properties, but its fineness was 0.29 dTex, which was thicker than those in Examples described above.

Comparative Example 5

(1) Production of Sheath-Core Undrawn Conjugated Fiber

Undrawn fibers having a core-sheath structure were produced using a resin raw material in which 1.0% by mass of the additive II was added to the core material A, and the sheath material a. At that time, a sheath-core composite spinneret was used, and a cross-sectional ratio of the sheath to the core (sheath/core) was adjusted to 40/60. Spinning conditions were adjusted as follows: an extruder cylinder temperature of a core material was 255° C.; an extruder cylinder temperature of a sheath material was 255° C.; a spinneret temperature was 270° C.; and a spinning speed was 500 m/minute. The formation of undrawn fibers having a thin fineness was attempted by adjusting an amount of the resin discharged.

However, the core material, discharged from the spinneret, had an MFR of 237.9 g/10 minutes, the sheath material had an MFR of 73.1 g/10 minutes, and an MFR ratio (=the core material MFR/the sheath material MFR) was 3.25. As the melt tension of the resin of the core material discharged from the spinneret was too low, the drawing was in a slightly unstable state, but undrawn fibers having a fineness of 0.67 dTex were spun.

FIG. 5 is a photomicrograph showing cross-sections of the undrawn fibers from Comparative Example 5. According to comparison in cross-sections of the undrawn fibers obtained by the microscope observation, the undrawn fibers from Comparative Example 5, shown in FIG. 5, were larger in the fineness unevenness, compared to the undrawn fibers from Examples 2, 4 and 5, shown in FIGS. 2 to 4, and the sheath to core ratio unevenness and the uneven coating with the sheath material (the exposure of the core material) were observed at the fiber level.

(2) Production of Drawn Conjugated Fiber

Immediately after 400 undrawn fibers (about 540,000 dTex), obtained in a spinning step, were prepared, collected tows were subjected to the pre-drawing treatment and then continuously subjected to the main drawing in the same manner and the same conditions as in Example 1.

As a result, a speed of the drawing fiber taking-out roller (G3 roller), capable of industrially stable drawing without causing the breakage by drawing was 45 m/minute, and a total draw ratio was 4.5 times. This can be considered to be because the fineness unevenness of the undrawn fibers was large in Comparative Example 5. The obtained drawn conjugated fiber had a fineness of 0.16 dTex, but the fiber physical properties varied greatly.

Comparative Example 6

(1) Production of Sheath-Core Undrawn Conjugated Fiber

Undrawn fibers having a core-sheath structure were produced using a resin raw material in which 7.5% by mass of the additive I and 0.2% by mass of the additive II were added to the core material A, and the sheath material a. At that time, a sheath-core composite spinneret was used, and a cross-sectional ratio of the sheath to the core (sheath/core) was adjusted to 40/60. Spinning conditions were adjusted as follows: an extruder cylinder temperature of a core material was 255° C.; an extruder cylinder temperature of a sheath material was 255° C.; a spinneret temperature was 270° C.; and a spinning speed was 500 m/minute. The formation of undrawn fibers having a thin fineness was attempted by adjusting an amount of the resin discharged.

However, conditions capable of spinning undrawn fibers could not be found. This can be considered to be because the decomposition of the additive I having a high MFR, added to the core material, by the additive II was excessively advanced. The core material, discharged from the spinneret, had an MFR of 180.7 g/10 minutes, the sheath material had an MFR of 72.5 g/10 minutes, and an MFR ratio (=the core material MFR/the sheath material MFR) was 2.49.

Comparative Example 7

(1) Production of Sheath-Core Undrawn Conjugated Fiber

Undrawn fibers having a core-sheath structure were produced using the core material A and the sheath material a. At that time, a sheath-core composite spinneret was used, and a cross-sectional ratio of the sheath to the core (sheath/core) was adjusted to 50/50. Spinning conditions were adjusted as follows: an extruder cylinder temperature of a core material was 255° C.; an extruder cylinder temperature of a sheath material was 255° C.; a spinneret temperature was 270° C.; and a spinning speed was 150 m/minute. The formation of undrawn fibers having a thin fineness was attempted by adjusting an amount of the resin discharged.

However, the core material, discharged from the spinneret, had an MFR of 68.9 g/10 minutes, the sheath material had an MFR of 73.9 g/10 minutes, and an MFR ratio (=the core material MFR/the sheath material MFR) was 0.93. As the melt tension of the resin of the core material discharged from the spinneret was slightly high, an undrawn fiber fineness capable of being stably spun reached only up to 1.50 dTex.

(2) Production of Drawn Conjugated Fiber

A two-stage drawing apparatus was used in which a first drawing bath (a first stage, steam with ordinary pressure) and a second drawing bath (a second stage, steam with ordinary pressure) were continuously arranged between three rollers so that the drawing step could be continuously performed after the spinning step described above. Subsequently, the undrawn fibers (about 50,000 dTex), obtained in the spinning step, were subjected to a two-stage drawing using steam with ordinary pressure of 100° C., in the first drawing bath under conditions of, a guide roller (G1 roller) speed of 150 m/minute, and a second stage drawing ratio (G3/G2) in a first drawing delivery roller (G2 roller) and a drawing fiber taking-out roller (G3 roller) of 1.05 times, while the speed of the first drawing delivery roller (G2 roller) was increased.

As a result, a speed of the drawing fiber taking-out roller (G3 roller), capable of industrially stable drawing without causing the fiber breakage or the breakage by drawing was 825 m/minute, and a total draw ratio was 5.5 times. It can be considered that this is caused by the MFR value of the core material, discharged from the spinneret, being lower than the range defined by the present invention, and further by the thick undrawn fibers. On the other hand, the obtained drawn conjugated fiber had good fiber physical properties, but its fineness was 0.30 dTex, which was thicker than those in Examples described above.

The results of the above are collectively shown in Tables 1 and 2 below.

TABLE 1

| | Core material | | Additive (% by mass) | | | | | Sheath material | | Ratio of sheath to core (%) | Fineness of undrawn fiber (dTex) | MFR of resin discharged | | Core material/ Sheath material |
|---|---|---|---|---|---|---|---|---|---|---|---|---|---|---|
| | Kind | MFR | I | II | III | IV | V | Kind | MFR | | | Core material | Sheath material | |
| Example 1 | A | 60 | 7.5 | — | — | — | — | a | 38 | 40/60 | 0.67 | 84.4 | 72.6 | 1.16 |
| Example 2 | A | 60 | 15.0 | — | — | — | — | a | 38 | 40/60 | 0.67 | 91.1 | 71.8 | 1.27 |
| Example 3 | A | 60 | 15.0 | — | — | — | — | a | 38 | 40/60 | 0.67 | 91.1 | 71.8 | 1.27 |
| Example 4 | A | 60 | 15.0 | — | — | 0.3 | — | a | 38 | 40/60 | 0.67 | 91.9 | 72.5 | 1.27 |
| Example 5 | A | 60 | 7.5 | 0.1 | — | — | — | a | 38 | 40/60 | 0.67 | 112.7 | 73.4 | 1.54 |
| Example 6 | A | 60 | 7.5 | 0.1 | — | — | — | a | 38 | 50/50 | 0.46 | 120.5 | 72.1 | 1.67 |
| Example 7 | A | 60 | 7.5 | 0.1 | — | — | — | a | 38 | 30/70 | 0.63 | 116.5 | 70.2 | 1.66 |
| Example 8 | B | 18 | — | 0.5 | — | — | — | a | 38 | 40/60 | 0.67 | 140.5 | 69.9 | 2.01 |
| Example 9 | C | 9 | — | 0.7 | — | — | — | a | 38 | 40/60 | 0.67 | 156.9 | 72.4 | 2.17 |
| Example 10 | A + B | 33 | — | 0.4 | — | — | — | a | 38 | 40/60 | 0.67 | 137.8 | 70.5 | 1.95 |
| Example 11 | B | 18 | 10.0 | 0.3 | — | — | — | a | 38 | 40/60 | 0.67 | 148.7 | 71.5 | 2.08 |
| Example 12 | A | 60 | 7.5 | 0.1 | — | — | — | b | 47 | 40/60 | 0.67 | 109.6 | 76.3 | 1.44 |
| Example 13 | A | 60 | 7.5 | 0.1 | — | — | — | a | 38 | 50/50 | 0.45 | 128.9 | 71.8 | 1.80 |
| Example 14 | A | 60 | — | — | — | — | — | a | 38 | 40/60 | 1.10 | 75.8 | 71.8 | 1.06 |
| Example 15 | A | 60 | 10.0 | — | — | — | — | a | 38 | 45/55 | 0.60 | 88.9 | 72.5 | 1.23 |
| Example 16 | A | 60 | — | — | 20 | — | — | a | 38 | 45/55 | 0.60 | 96.8 | 72.8 | 1.33 |
| Example 17 | A | 60 | — | — | 20 | 0.2 | — | a | 38 | 50/50 | 0.60 | 97.5 | 73.5 | 1.33 |
| Example 18 | A | 60 | — | — | 20 | 0.3 | — | a | 38 | 50/50 | 0.60 | 96.5 | 73.1 | 1.32 |
| Example 19 | A | 60 | — | — | 20 | — | 0.1 | a | 38 | 50/50 | 0.60 | 97.1 | 72.6 | 1.34 |
| Example 20 | A | 60 | — | — | 20 | — | 0.2 | a | 38 | 50/50 | 0.60 | 98.4 | 74.2 | 1.33 |
| Comparative Example 1 | D | 20 | — | — | — | — | — | c | 20 | 50/50 | 3.11 | 38.7 | 33.0 | 1.17 |
| Comparative Example 2 | A | 60 | 7.5 | 0.1 | — | — | — | c | 20 | 50/50 | 2.04 | 105.7 | 33.5 | 3.16 |
| Comparative Example 3 | A | 60 | — | — | — | — | — | a | 38 | 50/50 | 1.61 | 69.6 | 71.5 | 0.97 |
| Comparative Example 4 | A | 60 | — | — | — | — | — | a | 38 | 50/50 | 1.61 | 69.6 | 71.5 | 0.97 |
| Comparative Example 5 | A | 60 | — | 1.0 | — | — | — | a | 38 | 40/60 | 0.67 | 237.9 | 73.1 | 3.25 |
| Comparative Example 6 | A | 60 | 7.5 | 0.2 | — | — | — | a | 38 | 40/60 | Spinning was impossible. | 180.7 | 72.5 | 2.49 |
| Comparative Example 7 | A | 60 | — | — | — | — | — | a | 38 | 50/50 | 1.50 | 68.9 | 73.9 | 0.93 |

TABLE 2

| | Spinning and drawing method | Spinning speed (m/minute) | Drawing speed (m/minute) | Drawing temperature (°C.) First stage | Drawing temperature (°C.) Second stage | Draw ratio (time) | Fineness of drawn fiber (dTex) | Strength (cN/dTex) | Elongation (%) | Young's modulus (cN/dTex) | Heat shrinkage at 120° C. (%) | $\Delta H_{pp}$ of core material (J/g) | Degree of crystallinity (%) |
|---|---|---|---|---|---|---|---|---|---|---|---|---|---|
| Example 1 | Separate steps | 600 | 50 | 93 | 124 | 5.0 | 0.15 | 6.8 | 18.0 | 65.1 | 5.1 | — | — |
| Example 2 | Separate steps | 600 | 53 | 93 | 124 | 5.3 | 0.13 | 6.9 | 18.9 | 65.8 | 5.1 | — | — |
| Example 3 | Separate steps | 600 | 37 | 93 | 100 | 3.7 | 0.19 | 5.6 | 21.6 | 52.7 | 7.5 | 74.0 | 35.4 |
| Example 4 | Separate steps | 600 | 55 | 93 | 124 | 5.5 | 0.12 | 7.0 | 17.8 | 67.8 | 4.8 | 99.5 | 47.6 |
| Example 5 | Separate steps | 600 | 58 | 93 | 124 | 5.8 | 0.12 | 7.6 | 8.9 | 77.7 | 4.3 | — | — |
| Example 6 | Separate steps | 700 | 52 | 93 | 124 | 5.2 | 0.09 | 7.1 | 12.7 | 74.6 | 5.7 | — | — |
| Example 7 | Separate steps | 600 | 62 | 93 | 124 | 6.2 | 0.11 | 8.2 | 11.7 | 83.6 | 3.8 | — | — |
| Example 8 | Separate steps | 600 | 55 | 93 | 124 | 5.5 | 0.13 | 7.3 | 13.7 | 72.3 | 4.6 | — | — |
| Example 9 | Separate steps | 600 | 53 | 93 | 124 | 5.3 | 0.14 | 7.1 | 12.9 | 71.6 | 4.8 | — | — |
| Example 10 | Separate steps | 600 | 52 | 93 | 124 | 5.2 | 0.14 | 6.9 | 15.9 | 67.7 | 5.2 | — | — |
| Example 11 | Separate steps | 600 | 57 | 93 | 124 | 5.7 | 0.12 | 7.5 | 11.1 | 74.9 | 4.6 | — | — |
| Example 12 | Separate steps | 600 | 58 | 93 | 124 | 5.8 | 0.12 | 7.3 | 10.6 | 75.5 | 4.7 | — | — |
| Example 13 | Continuous step | 150 | 1200 | 100 | 124 | 8.0 | 0.06 | 6.8 | 15.7 | 60.8 | 5.8 | — | — |
| Example 14 | Separate steps | 500 | 55 | 93 | 124 | 5.5 | 0.20 | 6.8 | 13.5 | 67.9 | 5.2 | — | — |
| Example 15 | Continuous step | 250 | 1075 | 100 | 100 | 4.3 | 0.15 | 5.8 | 16.3 | 61.4 | 7.2 | — | — |
| Example 16 | Continuous step | 250 | 1000 | 100 | 100 | 4.0 | 0.17 | 5.6 | 17.6 | 59.8 | 7.5 | — | — |
| Example 17 | Continuous step | 250 | 1125 | 100 | 100 | 4.5 | 0.14 | 5.7 | 16.2 | 61.6 | 7.1 | 90.2 | 43.2 |
| Example 18 | Continuous step | 250 | 1200 | 100 | 100 | 4.8 | 0.13 | 5.9 | 15.8 | 63.5 | 7.5 | — | — |
| Example 19 | Continuous step | 250 | 1325 | 100 | 100 | 5.3 | 0.12 | 6.0 | 14.8 | 66.8 | 7.0 | 94.2 | 45.1 |
| Example 20 | Continuous step | 250 | 1450 | 100 | 100 | 5.8 | 0.11 | 6.1 | 14.5 | 61.8 | 6.0 | — | — |
| Comparative Example 1 | Separate steps | 500 | 54 | 93 | 124 | 5.4 | 0.60 | 6.1 | 25.7 | 44.8 | 5.8 | — | — |
| Comparative Example 2 | Separate steps | 500 | 60 | 93 | 124 | 6.0 | 0.35 | 6.5 | 23.6 | 51.7 | 5.5 | — | — |

TABLE 2-continued

| | Spinning and drawing method | Spinning speed (m/minute) | Drawing speed (m/minute) | Drawing temperature (° C.) First stage | Drawing temperature (° C.) Second stage | Draw ratio (time) | Fineness of drawn fiber (dTex) | Strength (cN/dTex) | Elongation (%) | Young's modulus (cN/dTex) | Heat shrinkage at 120° C. (%) | $\Delta H_{pp}$ of core material (J/g) | Degree of crystallinity (%) |
|---|---|---|---|---|---|---|---|---|---|---|---|---|---|
| Comparative Example 3 | Separate steps | 500 | 62 | 93 | 124 | 6.2 | 0.29 | 6.3 | 12.9 | 63.4 | 5.2 | — | — |
| Comparative Example 4 | Separate steps | 500 | 55 | 93 | 124 | 5.5 | 0.32 | 6.1 | 12.5 | 68.7 | 5.4 | — | — |
| Comparative Example 5 | Separate steps | 500 | 45 | 93 | 124 | 4.5 | 0.16 | 5.5 | 29.8 | 41.7 | 6.5 | 70.5 | 33.7 |
| Comparative Example 6 | Separate steps | — | — | — | — | \multicolumn{5}{No evaluations because spinning was impossible.} | — | — | — |
| Comparative Example 7 | Continuous step | 150 | 825 | 100 | 100 | 5.5 | 0.30 | 5.2 | 19.8 | 48.9 | 7.5 | — | — |

As shown in Table 1 and Table 2 above, it was confirmed that the production methods of Examples 1 to 20 are more excellent in making the fineness thinner than the production methods of Comparative Examples 1 to 7, and can produce the drawn conjugated fiber having a thin fineness and excellent fiber physical properties.

The invention claimed is:

1. A method for producing a drawn conjugated fiber comprising:
   a spinning step of obtaining an undrawn fiber having a core-sheath structure in which a core material is a resin containing, as a main component, a crystalline propylene polymer and a sheath material is a resin containing, as a main component, an olefin polymer having a melting point lower than that of the core material, by means of melt-spinning; and
   a drawing step of drawing the undrawn fiber, wherein the undrawn fiber has a fineness of 1.5 dTex or less, and
   in the spinning step, the core material discharged from a spinneret has a melt flow rate of 70 to 170 g/10 minutes at 230° C. and a load of 21.18 N, and a ratio of the melt flow rate of the core material discharged from the spinneret at 230° C. and a load of 21.18 N to a melt flow rate of the sheath material discharged from the spinneret at 230° C. and a load of 21.18 N is from 1 to 2.2, wherein at least one of a hydroxyamine ester, an isotactic polypropylene having a melt flow rate of 700 to 1550 g/10 minutes at 230° C. and a load of 21.18 N, and a metallocene polypropylene is added to the resin containing, as the main component, the crystalline propylene polymer, thereby adjusting the melt flow rate of the core material to be the melt flow rate of 70 to 170 g/10 minutes.

2. The method for producing a drawn conjugated fiber according to claim 1, wherein, in the spinning step, the sheath material discharged from the spinneret has a melt flow rate within a range of 60 to 90 g/10 minutes at 230° C. and a load of 21.18 N.

3. The method for producing a drawn conjugated fiber according to claim 1, wherein the crystalline propylene polymer, which is the main component of the core material, is an isotactic polypropylene.

4. The method for producing a drawn conjugated fiber according to claim 1, wherein a nucleating agent is added to the resin containing, as the main component, the crystalline propylene polymer.

5. The method for producing a drawn conjugated fiber according to claim 4, wherein the nucleating agent is an organic nucleus-creating agent.

6. The method for producing a drawn conjugated fiber according to claim 5, wherein the organic nucleus-creating agent is a metal salt of phosphate ester or a dibenzylidene sorbitol.

7. The method for producing a drawn conjugated fiber according to claim 1, wherein the olefin polymer, which is the main component of the sheath material, is a high density polyethylene.

8. The method for producing a drawn conjugated fiber according to claim 1, wherein the drawing step is continuously performed after the spinning step.

9. The method for producing a drawn conjugated fiber according to claim 1, wherein the drawing step is performed in pressurized saturated steam.

10. The method for producing a drawn conjugated fiber according to claim 1, wherein the drawn conjugated fiber has a fineness of 0.3 dTex or less.

\* \* \* \* \*